US009195819B2

(12) United States Patent
Hudson et al.

(10) Patent No.: US 9,195,819 B2
(45) Date of Patent: Nov. 24, 2015

(54) METHODS AND SYSTEMS FOR VERIFYING OWNERSHIP OF A PHYSICAL WORK OR FACILITATING ACCESS TO AN ELECTRONIC RESOURCE ASSOCIATED WITH A PHYSICAL WORK

(71) Applicant: BITLIT MEDIA INC., Vancouver (CA)

(72) Inventors: Peter Michael Bruce Hudson, Vancouver (CA); Marius Constantin Muja, North Vancouver (CA)

(73) Assignee: BITLIT MEDIA INC., Vancouver (CA)

( * ) Notice: Subject to any disclaimer, the term of this patent is extended or adjusted under 35 U.S.C. 154(b) by 0 days.

(21) Appl. No.: 14/384,198

(22) PCT Filed: Jul. 25, 2013

(86) PCT No.: PCT/CA2013/050578
§ 371 (c)(1),
(2) Date: Sep. 10, 2014

(87) PCT Pub. No.: WO2014/015437
PCT Pub. Date: Jan. 30, 2014

(65) Prior Publication Data
US 2015/0131870 A1    May 14, 2015

Related U.S. Application Data

(60) Provisional application No. 61/676,062, filed on Jul. 26, 2012.

(51) Int. Cl.
*G06K 9/00* (2006.01)
*G06F 21/32* (2013.01)
(Continued)

(52) U.S. Cl.
CPC .............. *G06F 21/32* (2013.01); *G06F 3/0483* (2013.01); *G06K 9/00463* (2013.01);
(Continued)

(58) Field of Classification Search
USPC ......... 382/100–103, 112–116, 135–140, 155, 382/162, 168, 173, 181–188, 209, 219, 232, 382/243, 254, 274, 276, 282–299, 305, 312, 382/321; 705/26, 26.1; 709/219, 217; 235/375
See application file for complete search history.

(56) References Cited

U.S. PATENT DOCUMENTS 6,250,549 B1   6/2001   DeFabio, Jr.
6,609,105 B2   8/2003   Van Zoest et al.
(Continued)

FOREIGN PATENT DOCUMENTS

WO   WO 2013/009743   1/2013

OTHER PUBLICATIONS

David G. Lowe, "Distinctive image features from scale-invariant keypoints," International Journal of Computer Vision, vol. 60, No. 2, pp. 91-110 (2004).
(Continued)

Primary Examiner — Seyed Azarian
(74) Attorney, Agent, or Firm — DLA Piper LLP US

(57) ABSTRACT

A method and system for allowing owners of a physical work, such as a book, to purchase an electronic version of the work by validating their ownership of the work using a personal electronic device, such as a smartphone, and marking the work. The owner is instructed to mark the work and to capture camera images of the work. The images are analyzed to identify the work, determine whether the work has been previously marked, and to verify that the work has been marked by the owner. Analysis may be performed remotely by a server in communication with the personal electronic device. Various means for authenticating ownership of the work are also disclosed, including 3D analysis, page curvature analysis, concurrent still image and video capture, detection of use of a video display to spoof the work, and geofencing.

46 Claims, 8 Drawing Sheets

(51) Int. Cl.
G06K 9/32 (2006.01)
G06Q 10/08 (2012.01)
G06F 3/0483 (2013.01)
G06Q 30/00 (2012.01)

(52) U.S. Cl.
CPC ....... *G06K 9/00469* (2013.01); *G06K 9/00577* (2013.01); *G06K 9/3258* (2013.01); *G06Q 10/0833* (2013.01); *G06F 2203/04803* (2013.01); *G06K 2009/0059* (2013.01); *G06K 2209/501* (2013.01)

(56) References Cited

U.S. PATENT DOCUMENTS

| | | | |
|---|---|---|---|
| 6,711,293 | B1 | 3/2004 | Lowe |
| 6,996,364 | B2 | 2/2006 | Israel |
| 7,236,596 | B2 | 6/2007 | Prokoski |
| 7,542,625 | B2 * | 6/2009 | Manber et al. ............... 382/305 |
| 7,580,988 | B2 | 8/2009 | Rudd |
| 7,904,568 | B2 | 3/2011 | Rudd |
| 8,473,481 | B2 | 6/2013 | Williams et al. |
| 2001/0010330 | A1 | 8/2001 | DeFabio, Jr. |
| 2001/0033661 | A1 | 10/2001 | Prokoski |
| 2002/0152173 | A1 | 10/2002 | Rudd |
| 2005/0063612 | A1 | 3/2005 | Manber et al. |
| 2007/0188793 | A1 | 8/2007 | Wakai |
| 2007/0226321 | A1 * | 9/2007 | Bengtson .................... 709/219 |
| 2009/0106037 | A1 | 4/2009 | Harindranath |
| 2010/0030869 | A1 * | 2/2010 | Rudd ........................... 709/217 |
| 2010/0063892 | A1 * | 3/2010 | Keronen et al. ............... 705/26 |
| 2010/0235406 | A1 | 9/2010 | Williams et al. |
| 2012/0202515 | A1 | 8/2012 | Hsu et al. |
| 2013/0019293 | A1 | 1/2013 | Puppin |
| 2013/0134213 | A1 * | 5/2013 | Pallakoff et al. ............. 235/375 |

OTHER PUBLICATIONS

Herbert Bay et al., "SURF: Speeded Up Robust Features," Eur. Conf. Comput. Vis., pp. 404-417 (2006).
Michael Calonder et al., "BRIEF: Binary Robust Independent Elementary Features," ECCV. 2010 (14 pages).
Ethan Rublee et al., "ORB: An Efficient Alternative to SIFT or SURF," ICCV. Barcelona; 2011 (8 pages).
Chanop Silpa-Anan C et al., "Optimised KD-Trees for Fast Image Descriptor M", CVPR. 2008. p. 1-8.
Robert J. Woodham, "Photometric Method for Determining Surface Orientation from Multiple Images", Optical Engineering, vol. 19, No. 1, pp. 139-144, Jan./Feb. 1980.
Berthold Horn, "Obtaining shape from shading information", The Psychology of Computer Vision, McGraw-Hill, Copyright 1974, pp. 115-155.
D. Marr et al., "Cooperative Computation of Stereo Disparity", Massachusetts Institute of Technology Artificial Intelligence Laboratory, A.I. Memo 364 (DTIC Document), Jun. 1976 (21 pages).
S. Ullman, "The Interpretation of Structure from Motion", Proceedings of the Royal Society of London, Series B, Biological Sciences, vol. 203, No. 1153, pp. 405-426, Jan. 15, 1979.
Serge Belongie et al., "Shape Matching and Object Recognition Using Shape Contexts," IEEE Transactions on Patter Analysis and Machine Intelligence, vol. 24, No. 24, pp. 509-522, Apr. 2002.
Dennis Decoste et al., "Training Invariant Support Vector Machines", Machine Learning, vol. 46, pp. 161-190 (2002).
Dan C. Ciresan et al., "Handwritten Digit Recognition with a Committee of Deep Neural Nets on GPUs", Technical Report No. IDSIA-03-11, IDSIA/USI-SUPSI, Dalle Molle Institute for Artificial Intelligence, Mar. 2011 (9 pages).
Dan Claudiu Ciresan et al., "Convolutional Neural Network Committees for Handwritten Character Classification," 2011 International Conference on Document Analysis and Recognition, p. 1135-1139 (2011).
Yann LeCun et al., "Gradient-Based Learning Applied to Document Recognition," Proc. IEEE. 86(11):2278-324, Nov. 1998.
Alexandre Alahi et al., "FREAK: Fast Retina Keypoint", Cvpr 2012 IEEE Conf., pp. 510-517 (2012).
Serge Belongie et al., "Matching with Shape Contexts", Stat. Anal. Shapes, Springer; p. 81-105 (2006).
"How Would You Find the Height of Objects Given an Image?", printed from http://stackoverflow.com/questions/2860325/how-would-you-find-the-height-of-objects-given-an-image; Printed Sep. 9, 2014 (2 pages).
"Steve's Digicams Forums: How to Calculate the Size of an Object", printed from Web.archive.org at http://web.archive.org/web/20120415223148/http://forums.steves-digicams.com/general-discussion/26691-how-calculate-size-object.html; Archived Apr. 15, 2012 (4 pages).
"Digital Photography School: Thread: Calculate Distance and Size of Objects in a Photo", printed from http://digital-photography-school.com/forum/other-digital-photography-technique-discussion/180542-calculate-distance-size-objects-photo.html, Printed Sep. 9, 2014 (3 pages).
"Can We Measure Size of an Object Using EXIF Data from a Photo?", Printed from http://photo.stackexchange.com/questions/23414/can-we-measure-size-of-an-object-using-exif-data-from-a-photo, Printed on Sep. 9, 2014 (2 pages).
"DIY Book Scanning: Welcome to DIY Book Scanner", printed from Web.archive.org at http://web.archive.org/web/20120614070759/http://www.diybookscanner.org/, archived on Jun. 14, 2012 (2 pages).
"eBook Offer", Manning Publications, printed from Web.archive.org at http://web.archive.org/web/20120701225828/http://www.manning.com/ebookoffer/, Archived on Jul. 1, 2012 (1 page).
"WWW.Ullmann-publishing.com/en", printed from Web.archive.org at http://web.archive.org/web/20120602194414/http://www.ullmann-publishing.com/en, archived on Jun. 2, 2012 (2 pages).
Devon Musgrave, "Microsoft Press Companion ebooks are Now Available for Download", dated Nov. 11, 2010, printed from Web.archive.org at http://web.archive.org/web/20110422174609/http://blogs.msdn.com/b/microsoft_press/archive/2010/11/11/microsoft-press-companion-ebooks-are-now-available-for-download.aspx (3 pages).
International Search Report issued in PCT/CA2013/050578, dated Oct. 30, 2013.
Written Opinion issued in PCT/CA2013/050578, dated Oct. 30, 2013.
Office Action in Canadian Application No. CA 2,843,680, dated Jun. 13, 2014.
Notice of Allowance issued in Canadian Application No. CA 2,843,680, dated Aug. 22, 2014.
John Canny, "A Computational Approach to Edge Detection". In: IEEE Transactions on Pattern Analysis Machine Intelligence, vol. PAMI-8, No. 6, pp. 679-698, Nov. 1986.
David Chen et al., "Building book inventories using smartphones", In: Proceedings of the International Conference on Multimedia, pp. 651-654, Oct. 25-29, 2010.
David Chen et al., "Low-cost asset tracking using location-aware camera phones". Applications of Digital Image Processing XXXIII, Conference vol. 7798, Sep. 7, 2010 (13 pages).
Mohammad Imrul Jubair et al., "A technique to detect books from library bookshelf image", In: 9th International Conference on Computational Cybernetics, pp. 359-363, Jul. 8-10, 2013.
Lukas Neumann et al., "Real-time scene text localization and recognition", IEEE Conference on Computer Vision and Pattern Recognition (CVPR 2012), pp. 3538-3545, Jun. 16-20, 2012.
Minako Sawaki et al., "Character Recognition in Bookshelf Images by Automatic Template Selection", 14th International Conference on Pattern Recognition, vol. 2, pp. 1117-1120, Aug. 16-20, 1998.
Jamie Shotton et al, "TextonBoost for Image Understanding: Multi-Class Object Recognition and Segmentation by Jointly Modeling Texture, Layout, and Context", International Journal of Computer Vision, vol. 81, pp. 2-23, Jan. 2009.
Eiji Taira et al., "Book Boundary Detection and Title Extraction for Automatic Bookshelf Inspection", In: 10th Korea-Japan Joint Workshop on Frontiers of Computer Vision, pp. 232-237, Feb. 3-4, 2004.

(56) References Cited

OTHER PUBLICATIONS

Sam Tsai et al., "Combining image and text features: a hybrid approach to mobile book spine recognition", Proceedings of the 19th ACM international conference on Multimedia (MM'11), pp. 1029-1032, Nov. 28-Dec. 1, 2011.

Alessandro Bissacco et al., "Photoocr: Reading text in uncontrolled conditions." IEEE International Conference on Computer Vision (ICCV), pp. 785-792, Dec. 1-8, 2013.

Gabriella Csurka et al., "Visual categorization with bags of keypoints." In Workshop on Statistical Learning in Computer Vision, ECCV, pp. 1-22 (2004).

Navneet Dalal et al., "Histograms of oriented gradients for human detection." IEEE Computer Society Conference on Computer Vision and Pattern Recognition (CVPR 2005), vol. 1, pp. 886-893, Jun. 25, 2005.

Weilin Huang et al., "Robust Scene Text Detection with Convolutional Neural Network Induced MSER Trees". ECCV 2014, Part IV, LNCS 8692, pp. 497-511 (2014).

Max Jaderberg et al. "Reading Text in the Wild with Convolutional Neural Networks", International Journal of Computer Vision, May 7, 2015 (20 pages).

Svetlana Lazebnik et al., "Beyond bags of features: Spatial pyramid matching for recognizing natural scene categories", IEEE Computer Society Conference on Computer Vision and Pattern Recognition, 2006 (vol. 2), pp. 2169-2178 (2006).

David G. Lowe "Object recognition from local scale-invariant features", Proc. of the International Conference on Computer Vision, Sep. 1999 (8 pages).

Lingqiao Liu et al., "In defense of soft-assignment coding", IEEE International Conference on Computer Vision (ICCV 2011), pp. 2486-2493, Nov. 6-13, 2011.

Lior Talker, "Book spine segmentation for bookshelf reorganization". M.Sc. Dissertation, Efi Arazi School of Computer Science, Jul. 2013 (52 pages).

Jay Yagnik et al., "The power of comparative reasoning", IEEE International Conference on Computer Vision (ICCV 2011), pp. 2431-2438, Nov. 6-13, 2011.

Supplementary European Search Report issued in EP 13 82 2225 dated Sep. 17, 2015.

International Search Report issued in International Application No. PCT/CA2015/050565 dated Aug. 27, 2015.

Written Opinion issued in International Application No. PCT/CA2015/050565 dated Aug. 27, 2015.

Feng Zhang et al., "Location-Based Authentication and Authorization Using Smart Phones", 2012 IEEE 11th International Conference on Trust, Security and Privacy in Computing and Communications (TRUSTCOM) pp. 1285-1292, Jun. 25, 2012.

U.S. Appl. No. 14/745,066, filed Jun. 19, 2015, Pending.

* cited by examiner

METHODS AND SYSTEMS FOR VERIFYING OWNERSHIP OF A PHYSICAL WORK OR FACILITATING ACCESS TO AN ELECTRONIC RESOURCE ASSOCIATED WITH A PHYSICAL WORK

CROSS REFERENCE TO RELATED APPLICATION

This application is a U.S. National Stage Application of International Application No. PCT/CA2013/050578 filed Jul. 25, 2013, which claims the benefit and priority of U.S. Provisional Patent Application No. 61/676,062, filed Jul. 26, 2012. All of the foregoing applications are incorporated by reference in their entireties.

FIELD OF THE INVENTION

The present invention generally relates to the field of electronic content dissemination and automated physical object recognition and validation using computer vision.

BACKGROUND

The recent rise in popularity of portable electronic devices such as eReaders, smart phones, and tablet computers, is causing a dramatic shift in the way that people read books and other printed material. However for people who own a large number of physical books there is no method for them to gain access to an electronic version of their physical books without purchasing another copy of the book in eBook format.

Digital media content consumers (e.g. readers of eBooks or digital music listeners) generally resent the need to re-buy at full price an electronic copy of a physical work that they already own. This resentment is evident in the profusion of "format shifting" of digital music from CDs to digital files (e.g. MP3s) for use on portable music players.

However, format shifting is not practical for physical books to eBook format. Whereas for owners of digital music CDs, it was possible to format shift the digital music from CD to MP3 format using a personal computer equipped with a CD-ROM reader and freely available software (e.g. Apple™ iTunes™); format shifting is not readily possible for physical books. One method of format shifting a physical book involves scanning each page of the book. While there are physical book scanning apparatuses (see: http://www.diybookscanner.org/), physical book scanners are single purpose bespoke hardware, and by no means as commonly available as personal computers and CD-ROM readers. As such, physical book owners are left with no practical means of format shifting their physical works into eBook format.

This difficulty in format shifting of physical books has contributed to the increasing availability of eBook content piracy on peer to peer file sharing services such as BitTorrent.

Furthermore, unlike musical recordings which have shifted from vinyl 45s and 78s records, to 8-tracks, to audio cassettes, to CDs, to MP3s over the last several decades, physical books have been printed on bound paper for centuries. The format stability of physical books has allowed for vast collections of physical books to be accumulated by individuals. Without a practical means of transferring these physical books to eBook format (short of re-purchasing each physical book in eBook format), an individual is unable to realize the benefits of owning and reading books in eBook format on a personal electronic device (e.g. eReader, tablet computer, or smartphone), and may be driven to acquiring eBook copies of their physical works through illegal channels (e.g. BitTorrent).

While industry associations such as the Motion Picture Association of America (MPAA) and Recording Industry Association of America (RIAA) have chosen to combat content piracy through criminal and civil prosecution of content pirates, companies such as Apple and Netflix have reduced the desirability of pirated digital content among non-technical users by providing conveniently packaged, high quality, digital music and movie content at a reasonable price point.

However, book publishers and eBooks vendors are unable and/or unwilling to offer a discounted eBook to an owner of a physical book, because it is impractical for them to validate that an individual is a legitimate owner of a physical book. Vendors of eBooks have considered offering owners of physical works electronic content bundled at the point of purchase or based on electronic sales records, or based on a photograph of the physical work (see U.S. Pat. No. 7,542,625 and US20130019293 A1). However they have not addressed the issue of digital copy leakage which occurs when a physical book transfers ownership (e.g. it is sold at a used book shop). Nor does U.S. Pat. No. 7,542,625 or US20130019293 A1 account for digital content leakage through books which are loaned (e.g. between friends or from a library).

When one considers that physical books are a widely resold item (used book stores are common as are used book trading websites), an eBook vendor or publisher has no way to ensure that a single physical book is not used as ownership proof to claim many eBook copies. Consider for example: Alice owns a physical book, Alice uses the physical book to purchase a discounted eBook version of the book from an eBook vendor. Alice then sells the physical book to Bob. Bob uses the physical book to purchase a discounted eBook version of the book from an eBook vendor. This eBook copy "leakage" is unacceptable to the eBook vendor and the publisher of the book.

Several book publishers and book vendors have developed systems for offering print and electronic book bundles. That is, when a person purchases a print edition of a publisher's title, they may also purchase the electronic edition. Several methods of print+eBook bundling, including their limitations, are described below:

Print+eBook bundling can be accomplished by publishers and book vendors at the point-of-sale. Point-of-sale bundling allows publishers to be satisfied that they are providing an eBook to a person who has purchased a print edition of one of their titles. One method of point-of-sale involves a person who has just purchased a print edition of a book, giving their name and email address to the book store staff Bookstore staff sends the name and email address of the person who purchased the print book, to the publisher. The publisher emails the person who purchased the print book, an eBook edition of their print purchase. This type of point-of-sale eBook bundling system was tested by the publisher "Angry Robot™" and the bookstore "Mostly Books™" in 2012 (http://the-digital-reader.com/2012/08/10/angry-robot-e-book-bundling-plan-triples-its-print-sales-at-a-uk-bookstore#.UcjvDPnveYQ). The limitations of point-of-sale eBook bundling as described directly above are several:

- The process is labour intensive and error prone: customers must write down their names and email addresses and the title they purchased. This information needs to be typed into a computer either by the bookseller or the publisher.
- The process allows customers to keep the eBook, even if they return the print edition for a refund or store credit.
- The process is difficult to scale up to a large number of booksellers. The level of labour involved in point-of-sale eBook bundling means that it is not a practical solution for deployment to a large number of booksellers.

An alternative method for offering bundled print and eBook editions is for publishers to produce print books each with a unique code (such as QR Codes or individual serial numbers). These unique codes can be used by the purchaser of a print edition to claim a digital edition when scanned using a smartphone (QR Codes), or when typed into the publisher's website. Manning Press is currently offering print and eBook bundling using this method (http://www.manning.com/ebookoffer/). There are several limitations to the method of printing unique codes in or on physical books. Unique codes are not secure against use by someone who has not yet purchased the print edition. That is, a unique code can be scanned or copied by an unscrupulous customer in a bookstore, without having to have first purchased the print book. In order to counter the threat of digital theft from a physical bookstore, some publishers such as h.f.ullman (http://www.ullmann-publishing.com/en/) only print unique codes inside of books, which are then shrink wrapped. The unique code printed inside a shrink wrapped book cannot be viewed until the book's shrink warp is removed by the customer after purchase. An alternative method of securing the unique code is to cover it with a scratch off layer. Scratch off codes have been used for titles published by Microsoft™ Press (http://blogs.msdn.com/b/microsoft-press/archive/2010/11/11/microsoft-press-companion-ebooks-are-now-available-for-download.aspx). If the unique code is covered by a scratch off layer, it allows both the purchaser and the bookseller to ensure that the unique code printed in or on the physical edition has not previously been used to claim a digital edition. A further downside of print and eBook bundling using unique codes is that they increase the cost of production of a printed book, because each individual book is printed slightly differently. Books and other high volume print jobs are traditionally printed using offset printing techniques rather than digital printing techniques. Offset printing has the advantage that the cost per unit (e.g. book) decreases for large volumes—a printing technology ideally suited to printing books for sale to a large consumer base of readers. However, offset printing techniques require that all pages are identical. That is, it is not possible to print a unique code onto a page of a book using offset printing techniques. And while digital printing costs continue to fall, the cost of protecting the unique code printed into a book using shrink wrap, or a scratch away cover, will always result in an increase in book production costs for publishers choosing to offer bundled eBooks using this technique.

Several publishers have adopted an "honour system" wherein readers who purchase a print edition of one of their titles are encouraged to send an email to the publisher to request the bundled eBook edition. The principal downside of this technique is that it is labour intensive for both the reader and the publisher. Furthermore, this method provides virtually no protection from abuse by unscrupulous individuals.

A recent USPTO Application (US20130019293 A1) and PCT Application (PCT/US2012/046056) outline a system and method for providing access to an electronic version of a physical book based on a dynamic challenge system. The method describes a system which would allow a user to prove the he or she was in possession of a physical book. While the method described does include a geographic security element to prevent users from using the system inside of libraries or bookstores, the system does not provide any security against a user who borrows a book from a library and claims access to the eBook edition after returning to his/her home. Additionally, the method described does not provide security against a user who purchases a physical book from a bookstore, claims the eBook edition when at home, and then returns the physical book to the bookstore for a refund. Furthermore, the system described does not provide protection against a single physical book being used multiple times to claim a companion eBook.

On Jun. 2, 2009, U.S. Pat. No. 7,542,625 B2 was issued to Amazon™ Technologies Inc. for a "Method and System for Access to Electronic Version of a Physical Work based on User Ownership of the Physical Work". The method described and claimed in U.S. Pat. No. 7,542,625 B2 describes a system whereby a user could prove their ownership of a physical work by means of providing images of their physical work or through the use of cross referenced billing record databases. A limitation of the method described in U.S. Pat. No. 7,542,625 is that it does not allow for the user to download and access an offline version of the digital edition of their physical work. Rather U.S. Pat. No. 7,542,625 only provides for users to be able to access digital images or scans of the physical work, not an associated but different digital edition such as a re-flowable text ePub. Indeed, the patent is specific in stating that the electronic version of a physical work is comprised of "images of the physical work", rather than an eBook which comprises reflowing scalable text. The system described appears to be a patent on a system to allow an Amazon.com customer to be able to view an expanded book preview, if they can show that they own a physical edition of the book.

Because there is no requirement to mark or deface the physical copy in the method described in U.S. Pat. No. 7,542,625 B2, the system does not protect against the situation where a book is borrowed from a library and used as proof of ownership, nor does it handle the case where a book is purchased from a local bookstore, used as proof of ownership, and then returned to the local bookstore after the user was granted online access to the electronic image version of the physical book. Furthermore, the method does not protect against the case where a single book could be lent between multiple people who can each use it to claim online access to the electronic image version of the physical book.

A further limitation of the system described in U.S. Pat. No. 7,542,625 B2 is that it proposes using billing records as a proof of ownership. While online billing records are proof that an individual purchased the physical book at one time, they are not proof that the individual remains the owner of the physical book at the time they seek access to the online electronic image version of the physical book. Additionally, physical billing records such as receipts are not well suited to proving ownership of a physical media carrier because receipts are not physically connected to the physical media carrier and as such could be given from one person to another in order that the second person could fraudulently claim ownership over the physical media carrier.

Therefore there is a need for a means by which owners of physical works, such as books, can gain access to discounted (or free) electronic versions of said physical works, that is not subject to one or more limitations of the prior art.

SUMMARY OF THE INVENTION

The above and other issues are addressed in the disclosed method, system and apparatus for electronically establishing ownership of a physical media carrier. An embodiment comprises a client requesting to establish ownership of a physical media carrier, a server requesting that the operator of the client mark the physical media carrier in a specific way, the client providing evidence of the operator's mark on the physical media carrier, and the server validating that the physical media carrier was correctly marked using the evidence provided by the client.

In accordance with an aspect of the present invention, there is provided a computer implemented method for verifying ownership of a physical work, the method comprising: instructing the user to mark a first specified portion of the physical work in a specified way; instructing the user to capture one or more camera images of one or more specified portions of the physical work, including the first specified portion subsequent to marking thereof; providing data to a computer, said data including the one or more camera images in digital format; analyzing the one or more camera images by the computer to determine whether one or more predetermined conditions have been fulfilled, wherein said conditions include verification that the user has marked the first specified portion of the physical work in the specified way; and upon determining that said conditions have been fulfilled, verifying ownership of the physical work.

In accordance with another aspect of the present invention, there is provided a computer implemented method for verifying ownership of a physical work, the method comprising: instructing the user to capture one or more camera images of one or more specified portions of the physical work, said one or more specified portions including a first specified portion, said first specified portion expected to have been previously marked in a specified way if the physical work had previously been used in a prior attempt to claim ownership of the physical work, said prior attempt having required marking of the first specified portion in the specified way; providing data to a computer, said data including the one or more camera images in digital format; analyzing the one or more camera images by the computer to determine whether one or more predetermined conditions have been fulfilled, wherein said conditions include verification that the first specified portion of the physical work had not been previously marked in association with said prior attempt to claim ownership of the physical work; and upon determining that said conditions have been fulfilled, verifying ownership by the user of the physical work.

In accordance with another aspect of the present invention, there is provided a system for verifying ownership of a physical work, the system comprising: a personal electronic device comprising a user interface module configured to: instruct the user to mark a first specified portion of the physical work in a specified way; and instruct the user to capture, using the personal electronic device, one or more camera images of one or more specified portions of the physical work, wherein one of said camera images captures the first specified portion subsequent to marking thereof; a server communicatively coupled to personal electronic device, the personal electronic device and the server collectively comprising one or more processing modules configured to: obtain data including the one or more camera images from the personal electronic device in digital format for analysis; analyze the one or more camera images to determine whether one or more predetermined conditions have been fulfilled, wherein said conditions include verification that the user has marked the first specified portion of the physical work in the specified way; and verify the user's ownership of the physical work upon determining that said conditions have been fulfilled.

In accordance with another aspect of the present invention, there is provided a system for verifying ownership of a physical work, the system comprising: a personal electronic device comprising a user interface module configured to: instruct the user to capture, using the personal electronic device, one or more camera images of one or more specified portions of the physical work, said one or more specified portions including a first specified portion, said first specified portion having been previously marked in a specified way if the physical work had previously been used in a prior attempt to claim ownership of the physical work, said prior attempt having required marking of the first specified portion in the specified way; a server communicatively coupled to the personal electronic device, the personal electronic device and the server collectively comprising one or more processing modules configured to: obtain data including the one or more camera images from the personal electronic device in digital format for analysis; analyzing the one or more camera images by the computer to determine whether one or more predetermined conditions have been fulfilled, wherein said conditions include verification that the first specified portion of the physical work had not been previously marked in association with said prior attempt to claim ownership of the physical work; and verify the user's ownership of the physical work upon determining that said conditions have been fulfilled.

In accordance with another aspect of the present invention, there is provided a computer implemented method for facilitating access by a user to an electronic resource associated with a physical work, the method comprising: instructing the user to mark a specified portion of the physical work in a specified way; instructing the user to capture a camera image of the specified portion of the physical work; providing the camera image in digital format to a computer; analyzing the camera image by the computer to determine whether the specified portion of the physical work has been previously marked by another user; upon determining that the specified portion has been previously marked by another user, denying the first user access to the electronic resource; upon determining that the specified portion has not been previously marked by another user, determining whether or not the specified portion was correctly marked by the user; upon determining that the specified portion has been marked by the user in the specified manner, granting the user access to an electronic resource via the computer or another computer.

In accordance with another aspect of the present invention, there is provided a system for facilitating access to an electronic resource associated with a physical work, the system comprising: a user interface module configured to instruct the user to mark a specified portion of a physical work in a specific manner, and to capture camera images of the specified portion of the physical work; an image capture module configured to obtain the camera images; a processing module configured to receive the camera images from the image capture module and analyze the camera images to determine whether the specified portion has been previously marked by another user; an access control module configured, upon determining that the specified portion has been previously marked by another user, to deny the user access to the electronic resource; a processing module that, upon determining that the specified portion has not been previously marked by another user, determines whether the specified portion has been marked in the specified manner; and an access control module that, upon determining that the specified portion has been marked in the specified manner, provides the user access to an electronic resource via the computer or another computer.

In accordance with another aspect of the present invention, there is provided a computer program product comprising a computer readable medium storing computer executable instructions thereon that when executed by a computer perform steps of a method as described herein.

DETAILED DESCRIPTION

Figure 1:
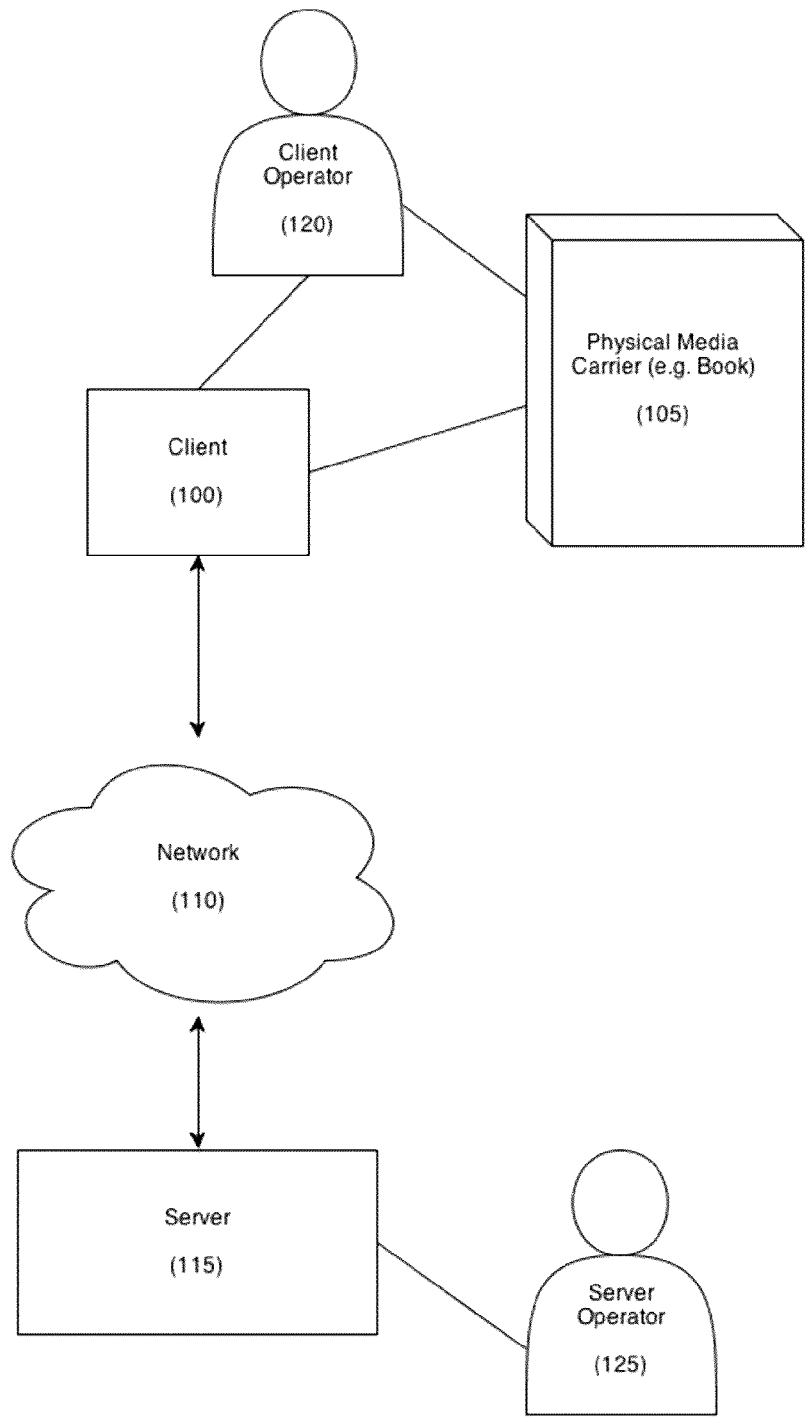
FIG. 1 illustrates a high level overview of a system provided in accordance with embodiments of the present invention.

The figures and the following description describe certain embodiments by way of illustration only. One skilled in the art will readily recognize from the following description that alternative embodiments of the structures and methods illustrated herein may be employed without departing from the principles described herein. References will now be made to several embodiments, examples of which are illustrated in the accompanying figures.

As used herein, the term "personal electronic device" refers to an electronic device configured for use by an owner of a physical media carrier, such as a book or other physical work, in performing the owner-oriented operations as described herein, such as entering user input, capturing still camera or video images, processing of data, and communicating with a remote server. A still camera refers to a camera used to capture photographs, while a video camera refers to a camera used to capture motion picture footage. A still camera and a video camera may share at least some of the same hardware components. The personal electronic device generally comprises a user interface for providing instructions to the owner, a camera or other capture device for capturing images of the physical media carrier, and a transceiver for communicating with a remote computing device such as a server. The personal electronic device may further comprise a memory having stored program instructions for carrying out the various operations described herein, and a microprocessor for executing said program instructions. An example of a personal electronic device is a smartphone, configured in accordance with software provided for example in an application, such as an "App", installed on the smartphone.

According to some embodiments, a user with a smartphone is able to prove that they own a physical book through the use of an application (an "App") installed on their smartphone which makes use of the smartphone's sensor systems such as its location sensor (GPS and/or via multilateral of radio signals between several radio towers of the network and the phone e.g. cell tower triangulation) and its camera and video camera capabilities, by sending information from the smart phone's sensors back to a networked server to validate the ownership of the physical book by requiring the user to submit evidence that they have permanently marked the physical book. Another type of personal electronic device may be used in place of a smartphone, such as a tablet, personal computer, network-enabled camera, or the like.

In some embodiments instead of a physical book, another type of physical work, also referred to as a physical media carrier, may be subjected to ownership validation. Examples include pieces of art or design works such as paintings, posters, sculptures, or the like and legacy media carriers such as 8-track tapes, vinyl records, cassette tapes, diskette packages, or the like. When reference is made herein to a physical book or physical work, it is understood that other suitable types of physical media carriers may be substituted for said physical book or physical work.

Aspects of the present invention provide for a method for verifying a user's ownership of a physical work, and possibly for providing access to an electronic resource such as an eBook upon such verification. In some embodiments, the user is instructed to mark a first specified portion of the physical work in a specified way, and to also capture camera images of specified portions of the physical work. One of the camera images captures the first specified portion after it has been marked. Data, including the camera images, is then analyzed to determine whether predetermined conditions, such as imposed conditions of access to an electronic resource associated with the physical work, have been fulfilled. Such conditions include verification that the user has marked the first specified portion of the physical work in the specified way. Such verification may be made at least in part on the basis of the above-mentioned one of the camera images. Other conditions may be additionally or alternatively be present, such as verification that the first specified portion of the work has not been previously marked in the specified way by the user or by another user, verification that the physical work is authentic rather than a falsified physical or virtual copy, verification that the camera images were taken inside or outside of certain geofenced regions, and the like. Upon determining that the predetermined conditions have been fulfilled, ownership by the user of the physical work is verified.

In some embodiments, the user is instructed to capture camera images of specified portions of the physical work to verify that it has not been previously marked. Typically, although not necessarily, the user is instructed to also mark the physical work following capturing of such camera images.

Other aspects of the present invention provide for a system configured to verify ownership of a physical work, and possibly to provide access to an electronic resource such as an eBook upon such verification. Such systems generally comprise a personal electronic device such as a smartphone and a server communicatively coupled to the personal electronic device, for example via a wired and/or wireless network. The server may further be coupled to a database storing information on the user and various physical works.

In some embodiments, the personal electronic device comprises a user interface module configured to instruct the user to mark a first specified portion of the physical work in a specified way. The user interface module is further configured to instruct the user to capture, using the personal electronic device, one or more camera images of one or more specified portions of the physical work. One of the camera images captures the first specified portion subsequent to the user marking it. The personal electronic device further includes the camera and an associated image capture module, and a communication module for communication with the server. The personal electronic device and the server collectively include one or more processing modules. Although some or all of the processing may be performed at the server, it is contemplated that the personal electronic device may perform at least a portion of the processing in some embodiments. The processing includes obtaining data including the one or more camera images from the personal electronic device. The processing also includes analyzing the camera images to determine whether predetermined conditions have been fulfilled. As above, such conditions may include verification that the user has marked the first specified portion of the physical work in the specified way. The processing also includes verifying the user's ownership of the physical work upon determining that the imposed conditions have been fulfilled. The system may further comprise other modules such as an access control module configured to provide access to an associated electronic resource, such as an eBook version of the physical work, upon ownership verification.

Various conditions, such as conditions imposed for verifying ownership of a physical work, and/or for accessing an electronic resource associated with the physical work, are described herein. Such conditions are imposed by the method and system as described herein and may, alone or in combination, be used to differentiate between real and fraudulent claims to ownership of a physical work and/or claims to access to an associated electronic resource. For example, conditions may be readily satisfied by an authentic owner of a physical work, while remaining difficult to satisfy by others. Ownership may refer to full ownership or limited ownership to a level which is deemed acceptable for a given purpose, such as providing access to an electronic resource.

System Overview

At a high level, FIG. 1 illustrates a system configured in accordance with embodiments of the invention. The system comprises a client computer (100) such as a personal electronic device connected via a communication network (110) to a server (115). The client (100) makes a request to the server (115) to prove ownership of the physical media carrier (105). The server sends an instruction to the client on the specific way that the operator of the client should mark the physical media carrier. The operator of the client marks their physical media carrier (105) in the way specified by the server and uses the client to provide evidence to the server of the way that the physical media carrier was marked. The server evaluates the evidence provided by the client as to how the physical media carrier was marked and, based on that examination, either instructs the client to: re-capture the evidence of the marking of the physical media carrier, or determine that the physical media carrier has not been properly marked, or determine that the physical media carrier has previous been marked in the specific way by another person or entity, or validates that the physical media carrier has been correctly marked.

The server may be a standard computer server, virtualized server, or group of servers configured to perform various computing operations as described herein. The server may comprise or may be operatively coupled to a database which stores various information on registered physical works and registered users. Examples of database entries related to a user include name, address, billing number, trustworthiness, and activity history. Examples of database entries related to a physical work include title, author or creator, ISSN, ISBN or other registration number, physical size and shape, selected textual content, selected images, and the like. It is understood that multiple copies of a registered physical work will typically exist. Some copies will be substantially identical. If different versions of the physical work have been issued, for example having similar content but different physical dimensions (e.g. hardcover and paperback), this information may also be stored in the database.

It is contemplated that various functions or operations may be performed by the client or by the server. For example, the client may operate independently from the server to provide the operator with instructions regarding marking the physical media carrier and/or capturing images. The client may further perform some of the above-mentioned evaluation operations. The distribution of operations between the client and server may depend on various factors, such as security, availability of the communication channel between client and server, and processing power of the client and/or server.

Detailed Example of System Function

One possible scenario of the operation of a smartphone App is given to show by way of the following example, with reference to at least FIGS. 2 to 7. It is noted that the smartphone and installed App may be replaced by another type of appropriately configured personal electronic device. It is also noted that the physical book mentioned below may be replaced with another type of physical work or physical media carrier.

The user downloads and installs the smartphone App onto their smartphone client (100). A user may be required to register with an online account at the smartphone App developer's website and provide details such as their name and credit card billing information and address. When the user starts the smartphone App, they may be required to log into their account using a username and password. Other means of user authentication may also be used.

Figure 2:
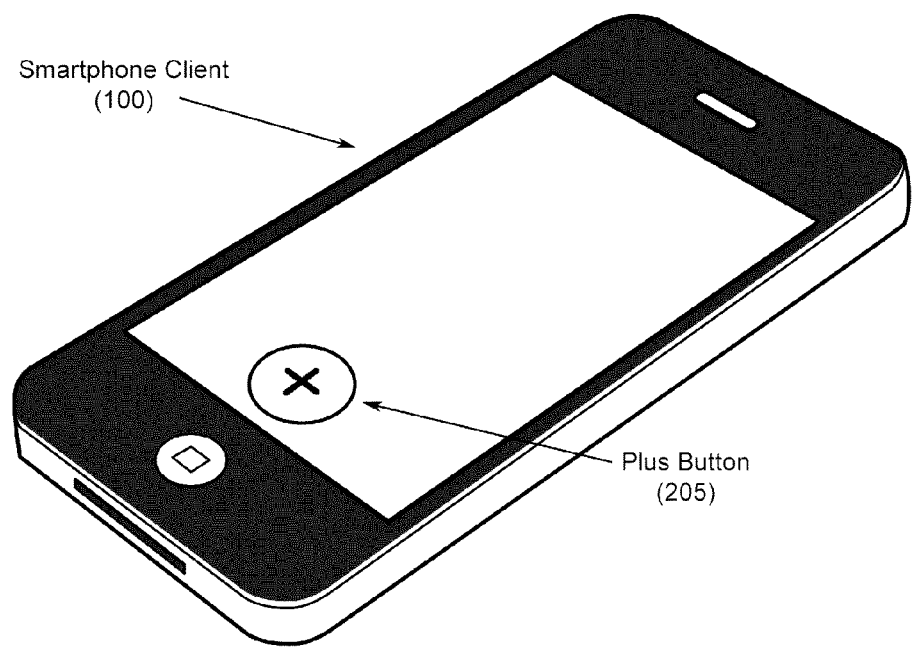
FIG. 2 illustrates a client user interface module provided in accordance with embodiments of the present invention.

Once the user has logged in or is otherwise authenticated, they may be presented with a user interface which displays: a list of physical books for which they have gone through the processes of becoming verified. When a user is ready to verify their ownership of a physical book they tap a button in the user interface (205), for example as illustrated in FIG. 2, to begin the physical book verification process. The user may be presented with an option for monitoring whether electronic versions of selected physical works are currently available or will be available in the future.

Figure 3:
FIG. 3 illustrates a client capturing image(s) of a physical work, in accordance with embodiments of the present invention.

Step 1:

The smartphone App installed on the client (100) then instructs the user to take a photo of the physical book (300) from the outside, from a specific angle, using the smartphone's camera and optionally the flash (320) as illustrated in FIG. 3. The smart phone's camera sensor provides a live preview (315) of the image to be captured. Onscreen guidelines (310) are provided to help the user align the edges of the physical book. The guidelines may represent an outline template of the book overlaid onto the current camera image, with the user instructed to align the edges of the book's image as closely as possible with the guidelines. This provides an image of the book from a known perspective, which facilitates image analysis, matching to an image database entry, or both.

In some embodiments, the user may be instructed to take a photo of the physical work such that the physical work lies in a plane that is substantially perpendicular to a line representative of the center of the camera's field of view, with said line passing through a portion, for example the center, of the physical work. This results in a photo which represents a plan view of the physical work. Such a view may be useful for optical character recognition and determining the relative dimensions of the physical work.

In some embodiments, the user may be instructed to take a photo of the physical work such that the physical work lies in a plane that is at a significant angle relative to a line representative of the center of the camera's field of view. This results in a photo which represents an arbitrary perspective view of the physical work. Such a view may be useful in verifying that the physical work is authentic, rather than a computer-generated image, since it is somewhat more difficult to falsify arbitrary perspective views of a physical work on a two-dimensional computer screen. The user may be instructed to take photos from one or a plurality of arbitrary angles in order to verify authenticity and/or three-dimensionality of the physical work.

As the user is aligning the physical book with the on-screen guidelines in preparation for taking the still photo, the smartphone app may concurrently capture the live view movie for use in detecting the structure and physical dimensions of the physical book, from the perspective differences between the captured frames, as described in more detail elsewhere herein. The movie capture period may terminate with capturing of the still photo or extend beyond the time of capture of the still photo by a predetermined amount of time.

Additionally or alternatively, the user may be instructed to capture movie-format footage of the physical book in a separate procedure. The client may be instructed as to how to move the camera via moving guidelines, arrows, or the like, overlaid onto a live view of the image being captured, via an animated, graphical, audible or textual set of instructions for moving the camera, or the like, or a combination thereof.

When the user is ready to take the still photo they tap the "Take Photo" button in the user interface (305). The image of the physical book is sent to a networked server and is processed in several ways (described below) to uniquely identify the title, author, and publisher of the physical book, or more generally to identify the physical work, and to determine whether or not the image sent by the client (100) is of a real physical book or is of a scene constructed by the user to fake a real physical book (e.g. a picture of a screen).

To uniquely identify the title, author, and publisher of the physical book, the image sent from the client (100) to the server (115) has its image features extracted and matched against a database of known book cover art images. The matching of the book photo to the database of known cover art images can be performed as follows:

Local image features (such as SIFT, SURF, BRIEF, ORB) are extracted from the image of the physical book. Such features and their extraction would be readily understood by a worker skilled in the art of machine vision, and are described for example in Lowe D G. "Distinctive image features from scale-invariant keypoints," Int. J. Comput. Vis. 2004; 60(2):91-110; Bay H, Tuytelaars T, Van Gool L. "SURF: Speeded Up Robust Features," Eur. Conf. Comput. Vis. 2006; 404-17; Calonder M, Lepetit V, Strecha C, Fua P. BRIEF: "Binary Robust Independent Elementary Features," ECCV. 2010; and Rublee E, Rabaud V, Konolige K, Bradski G. "ORB: an efficient alternative to SIFT or SURF," ICCV. Barcelona; 2011, herein incorporated by reference. We refer to these features as query features in the rest of the description, and the physical book image is referred to as the query image.

For each query feature the most similar feature from the database of cover images is found. In order for this process to operate without undue delay, the local features of the images in the database (also referred to as database features) may be pre-computed and indexed using a data structure that allows efficient nearest neighbour search (such as randomized kd-tree (as described in Silpa-Anan C, Hartley R. "Optimised KD-trees for fast image descriptor matching," CVPR. 2008. p. 1-8), herein incorporated by reference, or hierarchical clustering tree.

After the matching step above, a set of feature pairs is obtained, each pair consisting of a query feature and its closest database feature. This set of pairs is further partitioned into several groups, such that in each group the database features belong to the same database image.

For each group of pairs a geometry check is performed, in order to confirm that the image locations of the query and database feature pairs can be explained by a perspective transformation between the query image and the database image to which the group database features belong. A successful geometry check offers a high degree of confidence that a correct match has been found between the query image and a database image. An acceptably high degree of confidence may correspond to a confidence level which exceeds a predetermined threshold, a confidence level which exceeds the confidence level of the next highest match by a predetermined threshold, or the like.

After a successful geometry matching, the correct book is considered to have been identified and the title, author(s) and publisher associated with the database image that was matched are retrieved for further use by the server.

In some embodiments, the user may be instructed to take a picture of the physical book which includes its ISBN or ISSN, and the ISBN or ISSN may be processed, via optical character recognition, and used to identify the physical book.

The server checks to determine if the digital edition of the physical book that was identified from the image sent from the client to the server has been made available by consent of the copyright holder (i.e. the book publisher) through the system to verified physical book owners. Furthermore, the server checks the image of the physical book to ensure that there are no library barcodes, or other indications that the physical book in question should be considered ineligible for use as evidence of physical books ownership.

Detecting barcodes in an image is a relatively easy problem because barcodes are designed specifically to be easily read by machine algorithms. A way of detecting barcodes in images is by exploiting the fact that barcode regions have a low contrast in one direction and a high contrast in the perpendicular direction (for example a horizontal barcode will have a low vertical contrast and a high horizontal contrast). In order to detect barcodes the server module scans the image sequentially, analyzing local image patches and for each patch performs the following operations:

Compute the 2D variance around the center of the patch

Find the direction and value of the maximum variance (the minimum variance will be on the direction perpendicular to the one with maximum variance)

Store the difference between the maximum and minimum variance and the direction of the maximum variance for that pixel The barcode regions will have high values for the difference between the maximum and minimum variance and are detected by thresholding the image based on these values. An additional check can be used to confirm that the direction of maximum variance is consistent for all the pixels within detected barcode regions.

To determine that the image sent from the client (100) to the server (115) is an image of a real physical object and not an image from a computer monitor, the image can be processed by the server in several ways:

Camera images of a computer monitor contain artifacts that can be analysed to detect if the image captured is of a computer monitor or of a real object. One such artifact that can be detected by the server is the monitor pixel grid, which can be detected by performing a spatial frequency analysis of the image. An image of a book on a computer monitor will contain several high frequency components that are not present in an image of a real book. The server compares the 2D Fourier transform of the image sent from the client with the 2D Fourier transform of the image in the database. The server flags as suspicious a client image when the 2D Fourier transform of the image sent from the client contains comparatively more high frequency components than the 2D Fourier transform of the database image.

Depending on the hardware capabilities of the client (100), flash exposure can be enforced when capturing the image of the book and can be used as an additional step in validating that the images sent to the server (115) are of a physical book and not of a computer monitor. The surface of a computer monitor has a high reflectivity, and when using flash exposure while capturing an image of a reflective surface, the flash light reflected by the surface over-exposes a region of the image. The over-exposed region in the image can be identified by performing connected component analysis of the saturated (over-exposed) regions in the image. Each of the regions obtained from the connected component analysis operation is then analysed and if a region of elliptic shape above a predefined threshold is identified, the image is flagged as suspicious.

Another method of validating a real book is by inferring the 3D structure of the scene in the image. Computer vision techniques such as photometric stereo (shape from shading), binocular stereo, or structure from motion can be used to extract the 3D structure of the scene. Such techniques are discussed for example in Woodham R J. Photometric method for determining surface orientation from multiple images. Opt. Eng. 1980; 19(1):191139191139; Horn B K. Obtaining shape from shading information. MIT press; 1989; Marr D, Poggio T. Cooperative computation of stereo disparity. DTIC Document; 1976; and Ullman S. The interpretation of structure from motion. Proc. R. Soc. Lond. B Biol. Sci. 1979; 203(1153):405-26, both of which are herein incorporated by reference. For example, if using structure from motion, in addition to the image sent from the client (100) to the server (115), the client (100) also sends a sequence of images captured from the live-preview as the user aligns the physical book with the onscreen guidelines. Salient image features are detected and tracked in the sequence of images received from the client and their trajectories over time are used to reconstruct their 3D positions. The geometry of multiple 3D points in the scene is then analysed to confirm that is consistent with the known geometry of the book in the image (for example, the calculated dimensions of the book in the image should be same as the known dimensions of the book recognized).

In some embodiments the server may instruct the client to instruct the user to capture an image or images of two facing book pages. The server analyses these images using page curvature detection (described below) and text matching (described below). The server validates that the text recognized in the image appears on two distinct facing pages as in the physical book (and not as a continuous text column as in some electronic previews). In addition the curvature of the pages can be estimated and verified that it matches the curvature expected on two facing pages in an open book (more curved near the spine of the book and less toward the edge). Furthermore, depending on the position within the physical book (beginning, middle, or end) of the pages which are captured in the image, the curvature of the left page versus the right page serves as an indicator to the server that the physical book in the image sent from the client is indeed real and not a picture on a computer monitor.

Figure 4:
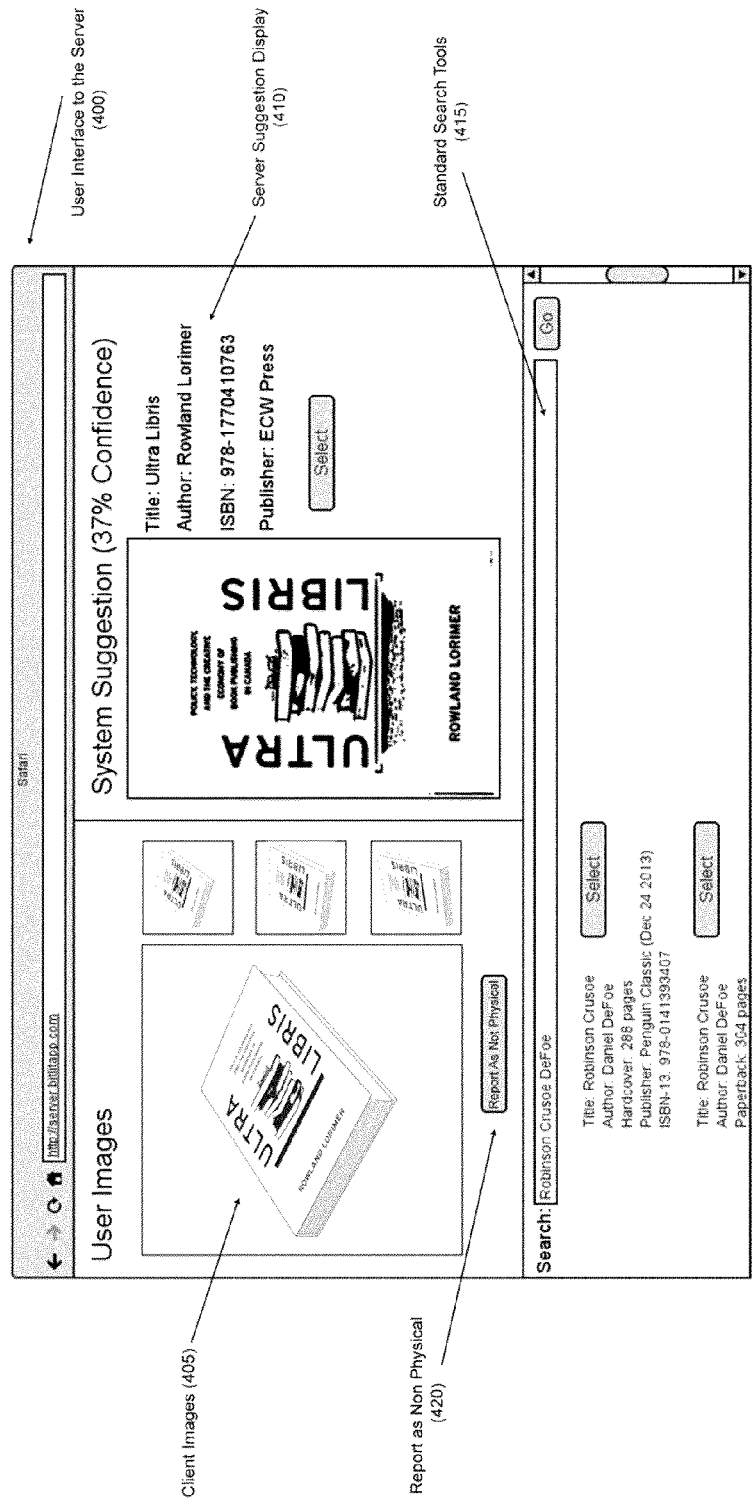
FIG. 4 illustrates a server interface for manual image processing, provided in accordance with embodiments of the present invention.
Figure 5:
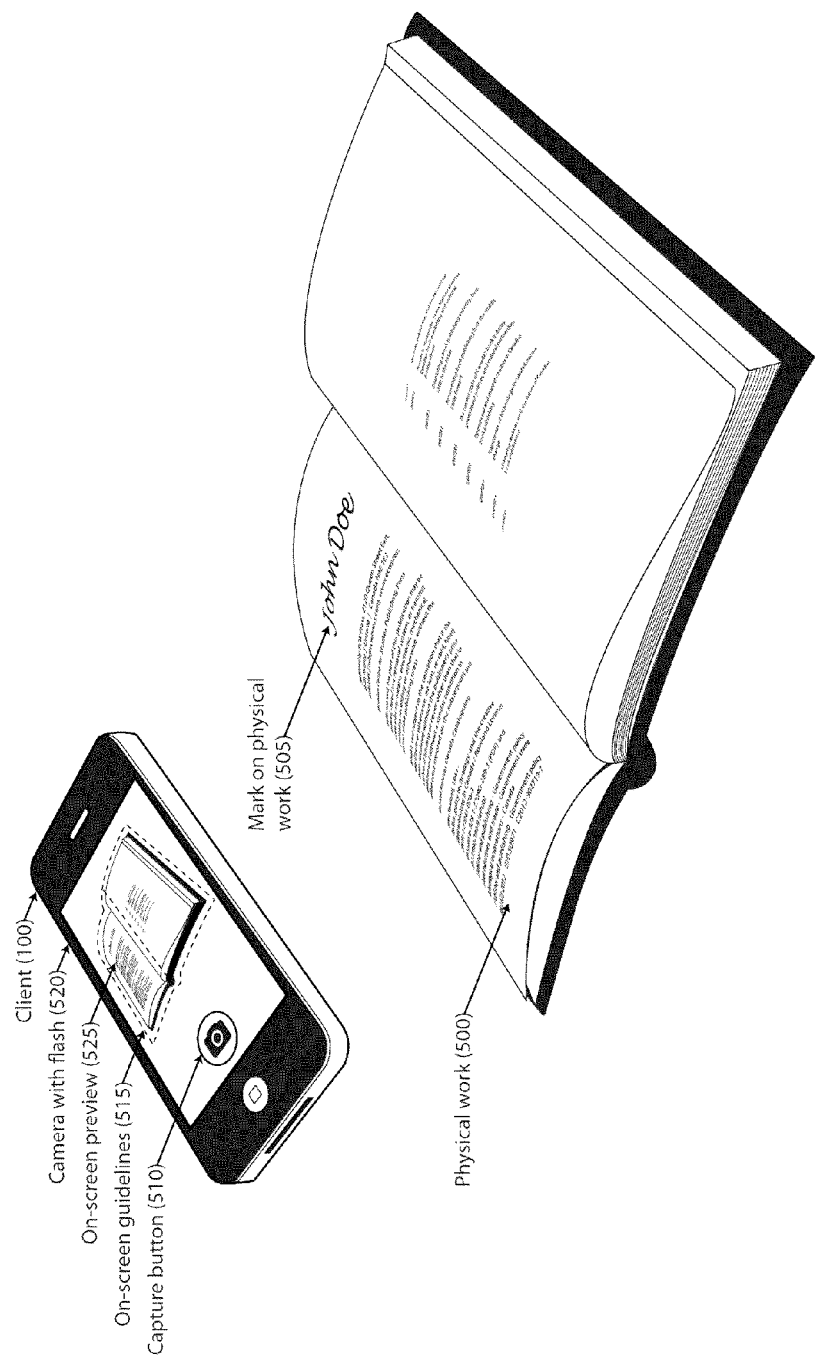
FIG. 5 illustrates a client capturing image(s) of a physical work after it has been marked, in accordance with embodiments of the present invention.

Optionally, the images transmitted by the client (100) to the server (115) can be sent for review by a human server operator (125) who has been given access to the server's audit and review module (FIG. 4). A human server operator (125) is able then to view via a user interface to the server (400), the image(s) sent by the client to the server (405) and can view the sequence of images captured during the time when the user is aligning the physical book with the on-screen guidelines. The human reviewer is able to view the server's suggestion (410) of the physical work in the client image. The human reviewer is able to search for the title, author, and publisher of the book using standard database search tools (415). The human reviewer is able to identify the physical work in the client photos either by selecting the server's suggestion or by selecting one of the search results. The human reviewer may be engaged for example when the automated operation of the server uncovers a potentially fraudulent attempt by a user to claim ownership of a physical work, and may thus be engaged to provide a second analysis for such matters.

Furthermore, the human reviewer is able to use his or her own senses to determine whether or not the image and sequence of images were taken of a real physical book or of an image on a screen or other attempt to cheat the automated image processing algorithms (e.g. printed images cut to size and taped around a cardboard box). If the human review suspects that the images submitted are not of a real physical work, they may report the images as being of a non-physical work (420). The human reviewer may follow a predetermined procedure or checklist in order to make such a determination, for example.

Figure 6:
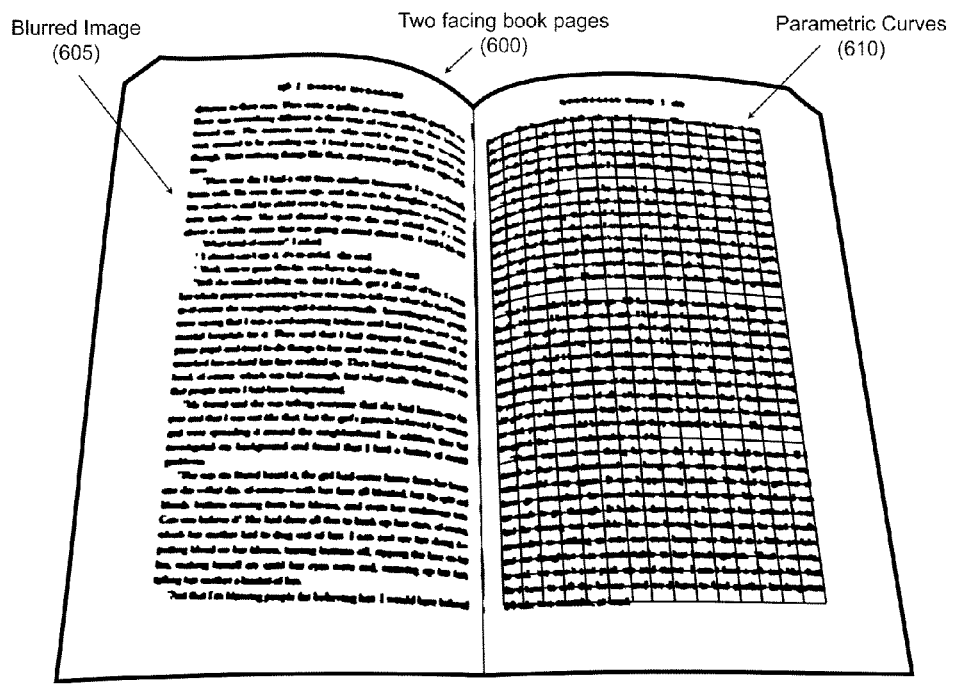
FIG. 6 illustrates page curvature detection and de-warping, in accordance with embodiments of the present invention.

Step 2:

The next step in verifying ownership of a physical book is that the server (115) sends a message to the client (100) to instruct the client operator (120) to mark their physical book in a specific way. The marking is typically made in a permanent manner, for example using permanent ink. In one embodiment of the invention, the server instructs the client to instruct the user to write their name on the physical book's copyright page (505). Once the user has written his or her name on the physical book in the place requested by the server (e.g. the copyright page), the user is required to capture an image of the mark using the personal electronic device. For example, using the capture image button (510) illustrated in FIG. 5, the user may capture an image of their name written on the copyright page. The captured image may include the entire copyright page and the page facing the copyright page (525), for example. Onscreen guidelines (515) and a live preview (525) from the smartphone's image sensor and flash (520) are provided to aid the user in aligning the physical book with the user's mark visible with the angle of imaging requested by the server. This image of the physical book's copyright page and facing page with the user's hand written name on the copyright page is transmitted from the client (100) to the server (115). Additional images captured while the user is aligning the book in the onscreen preview (525) with the on-screen guidelines (515) may also be sent to the server for analysis and/or human review. The images are processed by the server in the following ways:

The image is analysed to determine the page curvature to determine the shape of book pages. The shape of two facing book pages (600), as illustrated in FIG. 6, can be used as an indicator in validating that the image is of a real physical book. Furthermore, page curvature detection can also be used in de-warping the image of the book pages in order to improve the accuracy of optical character recognition used in text matching (described below). The page curvature analysis can be performed by identifying the page textlines using connected component analysis and/or ridge analysis of a blurred image (605) of the page(s). Parametric curves may be fitted to the detected textlines (610) in order to reduce noise and to obtain a more concise representation. The page curvature may be estimated by integrating or averaging over the curvatures of the individual textlines.

In another possible implementation, better suited for pages with many graphical elements, local image features can be detected and computed on the image of the book page(s). Local image features may include, for example, SURF, BRIEF, ORB, or the like as mentioned above, and/or features such as disclosed U.S. Pat. No. 6,711,293, herein incorporated by reference. The detected features may be matched with known features computed on the respective pages while unwarped. Pairwise correspondences are established and used in a global estimation of the page curvature.

In some embodiments, features captured in the image, which are distorted due to page curvature, may be matched with undistorted features stored in a database holding images of book pages indexed by book identity and page number. By comparing the distorted feature with the corresponding undistorted feature, page curvature may be determined Specifically, the page curvature may be inferred as that page curvature which, when applied to the undistorted version of the feature, most closely matches the distorted version of the feature.

The image is analysed to detect text in images of book pages. Text detection can be performed using optical character recognition (OCR) techniques and can be used to validate the authenticity of a physical book and to ensure that the user has marked the correct page (e.g. the copyright page) in their physical book. The accuracy of the optical character recognition can be improved by undoing the page distortions using page curvature analysis techniques (described above). The text detected is then matched to the known text of the book to validate authenticity of the physical book. Alternatively, the book image may be matched to database content for the book by matching features of the captured image with features of a template image stored in the database, wherein said matching is tolerant to predetermined amounts of distortion due to page curvature.

In various embodiments, the text that is recovered via OCR of the selected pages of the physical book is matched against the known text of the book's page stored on the server. An approximate match (so as to allow for errors in the OCR algorithm) of the text recovered via OCR with the true text of the book is used as a positive indicator that the user does have in their possession the physical book with the specified ISBN/ISSN. A low match score could be an indicator of photos taken under poor lighting conditions, camera shake, or book movement. If a low match score is achieved for the OCR text to actual book text, the user may be prompted to take additional photographs of pages selected by the server with advice on how to get the best photos (i.e. good light, book lying flat on a table, hold smartphone camera steadily).

If the OCR recovered text does not match the known book page text, the user is prompted to take the photo again with a reminder of the page number, since it is possible that the user accidentally took a photo of the wrong page. In one embodiment, if the recovered OCR text does not match after a predetermined number attempts, the user is prompted that physical book verification is not possible, and they are returned to the home screen.

The image is also processed to identify and validate the client operator's (120) mark on the physical book (105). The server identifies the marked region and uses optical character recognition techniques to verify that the correct name or other mark has been written. For identifying the marked region of the page, a possible implementation compares the page with a previously known image of the unmarked page and the marked region is inferred from the difference between the two images. The mark may further be stored separately by "subtracting" the unmarked image from the marked image. In another possible implementation segmentation algorithms such as stable region analysis or connected component analysis may be used to detect text regions on the page. The text regions are then filtered by eliminating the regions with text known to be on the page.

In some embodiments, to aid in comparison of the marked image and the unmarked image, the previously taken unmarked image is presented as a guide when capturing the marked image. For example, while capturing the marked image, the personal electronic device may provide a live camera image preview with the previously taken unmarked image as a semi-transparent layer on the camera preview area to aid the user in aligning their second photo with their first photo. Additionally, alignment marker overlays are present to aid the user in aligning the edges of the book with the edges of the camera frame. Thus, the user may be guided to take the marked image and the unmarked image from substantially the same distance and perspective.

Once the marked region containing the handwritten name has been identified, each letter of the name may be segmented and then recognized. Machine learning techniques such as K-Nearest Neighbours using shape context features, support vector machines, neural networks and convolutional networks are effective at classifying handwritten text characters. Such techniques are discussed, for example, in Belongie S, Malik J, Puzicha J. "Shape matching and object recognition using shape contexts," Pattern Anal. Mach. Intell. IEEE Trans. 2002; 24(4):509-22; Decoste D, Scholkopf B. "Training invariant support vector machines," Mach. Learn. 2002; 46(1-3):161-90; Ciresan D C, Meier U, Gambardella L M, Schmidhuber J. "Handwritten digit recognition with a committee of deep neural nets on gpus," 2011; Ciresan D C, Meier U, Gambardella L M, Schmidhuber J. "Convolutional neural network committees for handwritten character classification," Doc. Anal. Recognit. lcdar 2011 Int. Conf. 2011. p. 1135-9; and LeCun Y, Bottou L, Bengio Y, Haffner P. "Gradient-based learning applied to document recognition," Proc. IEEE. 1998; 86(11):2278-324, all of which are herein incorporated by reference. Using one or a combination of such classifiers, each handwritten letter is independently classified as one of the alphabet letters and the recovered name is verified to match the name of the user claiming ownership of the physical book.

In one embodiment, stamps or a person's signature can be used instead of handwritten names in order to uniquely mark the books. Each user may be required to register a unique stamp or signature to their user account profile, after which the stamp can be used to mark the server specified portion of the book as proof of ownership. For recognizing the stamp on a copyright page or other specified region of the book, the image is first segmented using a similar technique as for the handwritten names (described above), by performing stable region analysis or connected component analysis followed by filtering the regions known to be present on the page. The content of each remaining region is matched to the stamp registered in the user profile by using a combination of local feature descriptors such as ORB, FREAK (Alahi A, Ortiz R, Vandergheynst P. Freak "Fast retina keypoint. Comput. Vis. Pattern Recognit," Cvpr 2012 IEEE Conf. 2012. p. 510-7) and shape context (Belongie S, Mori G, Malik J. "Matching with shape contexts," Stat. Anal. Shapes. Springer; 2006. p.

81-105), both of which are herein incorporated by reference, using the same techniques used for matching local features of client images to local features of database images of book covers (described above).

In one embodiment, a reference object of known size (e.g. a coin) may be included in the process described above for the registration of a person's stamp or signature. The use of the reference object allows for the calculation of true physical size of the user's stamp and/or signature. The true physical size of the user's mark can then be used as a reference object during the image processing of the image of the physical work after it has been marked with the stamp or signature by the user, to determine the physical media carrier's true physical dimensions. The physical media carrier's true physical dimensions can then be compared to the known physical dimensions of the physical media carrier as an indicator of the veracity of the physical media carrier.

Other forms of user marks may also be accepted in various embodiments. In one embodiment the mark may be arbitrary with no requirement for consistency between markings made by the same user on different physical works. Rather, in such embodiments the mark serves primarily to provide a lasting indication that a given copy of the physical work has been marked, and thus does not necessarily also have to identify the user. The image of the mark made on the given copy may be extracted and stored in a database. Then, future attempts to claim ownership to physical works having the same title or characteristics as the given copy may be checked to ensure they do not contain the particular mark stored in the database. This may be done by image analysis of a corresponding portion of the physical work where the mark has been made in the given copy, to verify that said corresponding portion does not also contain the same mark. The mark may be made with pen, permanent ink, or via another suitable and relatively permanent means. In some embodiments, the mark may be made by damaging or removing a portion of the physical work in a recognizable and verifiable manner, for example through physical or chemical means.

Figure 7:
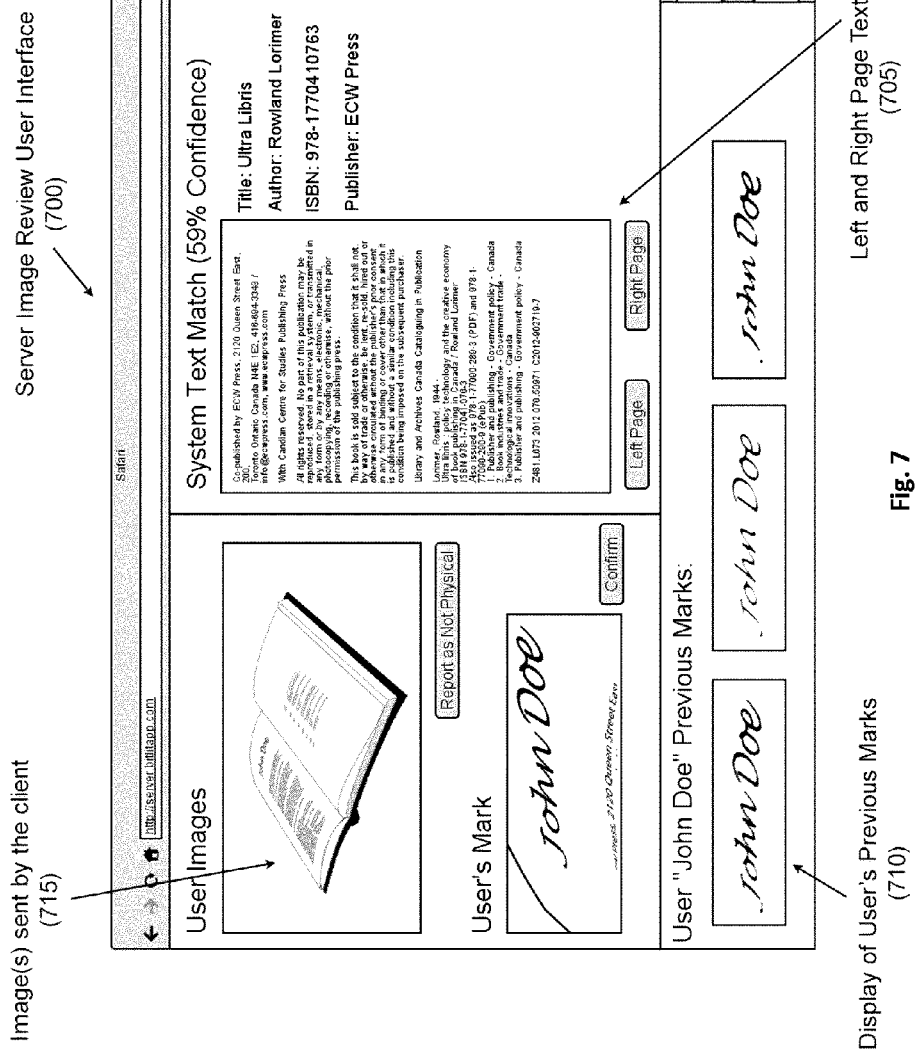
FIG. 7 illustrates a server interface for human identification of images of marked physical works, provided in accordance with embodiments of the present invention.

Optionally, the image of the page including the user's mark and/or the facing page which is transmitted by the client (100) to the server (115) can be sent for review by a human server operator (125) who has been given access to the server's audit and review module user interface (700) illustrated in FIG. 7. The human reviewer is able to make a determination as to whether or not the image sent by the client (715) was taken of the correct page(s) of the real physical book. The determination may be made on the basis of reproducible aspects of human perception and a set of predetermined criteria, for example set forth on a checklist, a set of computer prompts, or the like. In various cases, human perception may augment automated computer perception. The user interface displays the image(s) sent from the client to the server and displays the known text from the left and right pages that were requested in the photo from the client (705). The server displays the user's mark on the page and a selection of the users previous marks on physical works (710) allowing the server operator to evaluate if the user's current mark is similar to how they have previously marked other books. The server operator is able to confirm that the user marked their physical work in the correct way and that they used the client to submit a clear photo or set of photos of their mark on the physical work.

In still further embodiments, audits and/or verifications may be performed by human reviewers at least in part using their informed judgment to detect fraudulent types of activities, or new types of attempts to defraud the system. The system may then be adjusted to counteract such attempts or trends. Thus, new verification steps may be added as required.

In some embodiments, the pictures of a physical work may be processed to determine its size and/or relative dimensions, such as a ratio of page height to page width and/or thickness. When using a single picture, unless the distance from the camera to the object is known, only relative dimensions such as the page width to height ratio, can be determined. A reference object such as a coin or a pen can be placed within the camera image in order for absolute dimensions to be computed. When using multiple images, 3D reconstruction techniques such as binocular stereo, structure from motion or the like can be used to determine absolute dimensions without the need of a reference object. Absolute and/or relative dimensions may be compared against database entries which specify available dimensions of the physical work. If the size and/or relative dimensions do not match an expected value based on the database entries, then the perceived probability that the physical work is not authentic (but rather is a photocopy, digital image, or printout) may be increased. The use of guidelines superimposed on the camera capture view may facilitate determining the physical work's size.

In some embodiments, the user may be instructed to provide camera images of different pages of a book, and the sizes and/or relative dimensions of the pages in the different images may be compared. If a significant variation in page size is detected, then the perceived probability that the physical work is not authentic may be increased.

In some embodiments, the user may be instructed to record video of the physical media carrier. The user is instructed to show certain features of the physical work. For example, in the case of a book, the user may be instructed to sequentially show the book's spine, the front cover, the marked or unmarked copyright page, the back cover, and the like. In some embodiments, the user may be instructed to record their marking of the physical media carrier. At each step in the video recording process the user may be shown the required feature to be recorded as superimposed text on the video recording area. When the user has recorded a desired feature, they may press a "Next/Finish" button. The number of features of the book that need to be video documented may be determined by the server and can be reduced as a user becomes a trusted user. The video serves as further evidence that the user does indeed own this physical book in question since video is considerably more difficult to fake than still pictures. In some embodiments, individual captured frames of the video can be analysed in the same ways as the photos mentioned above were analysed. In some embodiments, the video is taken concurrently with the pictures, as described elsewhere herein. The video may be saved by the server in order to facilitate potential dispute of ownership or suspicion of fraud. The video may show the user marking the book, and hence be used to verify both that the book was previously unmarked and that it has been marked.

In some embodiments, the system comprises processing module configured to calculate the trustworthiness of a user based on their past behavior, and an access control module configured such that, upon determining a user is of high trustworthiness, the user is enabled to: establish ownership using relatively fewer photographs of a physical work, relatively less video evidence of the features of the physical work, or the like.

In some embodiments, rather than capturing a single still image, a sequence of still images can be captured, for example by using a "burst" or "continuous shoot" mode of a still camera. Such a sequence of still images may be used in place of video or otherwise used to compare images of the physical work from slightly different angles. Indeed, a sequence of still images separated in time by a predetermined amount may be regarded as a type of motion picture video and utilized in the same manner. In some embodiments, the camera may be a 3D camera such as a binocular camera, which inherently captures images from slightly different angles for 3D reconstruction.

In some embodiments, the use of accelerometer and gyroscope data in conjunction with two or more images, or sets of images, or video segments, may be used to reconstruct a 3D model of the physical work based on stereographic photo techniques. For example, accelerometer and gyroscope data may be used to record how the personal electronic device translates and rotates in space between image capture events or during video recording. This data may then be used to reconstruct a 3D model of the physical work. For example, the relative locations from which successive photos are taken may be correlated with the photo images in order to reconstruct a 3D model of the physical work. Different angles and distances to the physical work may be used to facilitate reconstructing size and shape of the physical work. Details of appropriate stereographic photo techniques, 3D rendering and inverse rendering techniques, and the like, would be readily understood by one skilled in the art.

In various embodiments, geofencing is used to selectively enable the personal electronic device to interact with a physical media carrier such as a book. For example, the personal electronic device may be equipped with a GPS system, and may only validate photos or videos taken of a physical media carrier when the personal electronic device is at the user's registered home address or other registered address. Additionally or alternatively, the personal electronic device may be configured to inhibit capturing valid photos or videos of a physical media carrier to be registered when it is located at a library, bookstore, or other location at which a user could conceivably attempt to photograph physical media carriers which are not owned by the user. Geofencing may incorporate various countermeasures against geocoordinate spoofing, as would be readily understood by a worker skilled in the art.

In various embodiments, the degree to which ownership of a physical media carrier is validated is adjusted to an appropriate level, for example by a server. For example, in some embodiments, validation of a physical media carrier may proceed according to one of several levels, such as a low level, a moderate level, or a high level. The moderate level may correspond to a default level and may proceed as described in the detailed example above, with the user instructed to take certain photos and/or videos, mark the copyright page, and take a further photo and/or video. The low level may correspond to an expedited process wherein the user may be instructed to take a reduced set of photos and/or record a video showing fewer features, wherein analysis of the photos and/or videos is less detailed, wherein the confidence level threshold for validation is lower, wherein escalation to a human operator for further analysis is less likely, or the like. The low level may be applied for example when a user has achieved "trusted" status, as outlined below. The high level may correspond to an enhanced process, wherein the user may be instructed to take a larger set of photos and/or videos, wherein analysis of the photos and/or videos is more detailed, wherein the confidence level threshold for validation is higher, wherein escalation to a human operator for further analysis is more likely, or the like. The high level may be applied for new users, users who are suspected of fraudulent behaviour, applied randomly as an auditing procedure, or the like. Reduced geofencing requirements may be applied for the low level while enhanced geofencing requirements may be applied for the high level. For example, the user may be allowed to register an additional address other than the credit card billing address (e.g. a vacation cottage) where the user is allowed to make claims.

In some embodiments, a geospatial-temporal-title anomaly detection scheme may be used to further secure against potential fraudulent claims of ownership of physical books. This scheme seeks to identify when a large number of physical books of the same title (ISBN) are claimed within a small geographic area, within a short period of time. The scheme is implemented, for example by a server, by having a potential for fraud score (PFFS) associated with every physical book claim which is ever made. Where PFFS is calculated as:

$$(PFFS) = \sum_{i=0}^{n} \left( \frac{1}{1 + ad_i} \right) e^{-\beta t_i}$$

Where: n is the number of claims of the same book title (ISBN) within a given geographic radius over a given number of days; $d_i$ is the geographic distance between the billing address of the claim for which we are calculating the PFFS and the $i^{th}$ claim; $t_i$ is the time in days between the dates of the claim for which we are calculating the PFFS and the $i^{th}$ claim; and Alpha ($\alpha$) and Beta ($\beta$) are constants used to tune the scoring algorithm over time to provide appropriately time and distance weighted scores.

This logic is specifically designed to detect potential fraud by those who may have developed a method for bypassing the security of the system (e.g. transcribing the user's mark using disappearing or erasable ink). When a claim has a sufficiently high PFFS it may trigger the need for a review of the claim evidence (photos, GPS location, and video) by a human to determine if there is evidence of a fraudulent claim. Additionally or alternatively, the degree to which ownership of a physical media carrier is validated may be adjusted based on the PFFS or similar metric.

In some embodiments, the system comprises a processing and calculation module configured to calculate a probability that an image of a physical work is being used for fraudulent purposes based on a statistical analysis of photos of the same physical work within a geographic and temporal locality, and an access control module configured, upon determining that the photo of the physical book is being used for fraudulent purposes, to deny the user with access to the electronic resource via the computer or another computer.

In various embodiments, the location of the user marking is consistent at least between copies of a given physical work. In various embodiments, the location of the user marking is on the copyright page of the physical book. This facilitates ease of inspection of a physical work to determine whether or not it has been previously marked and therefore potentially ineligible for use in verifying ownership of the physical work, for example in order to obtain access to a corresponding electronic resource.

It is contemplated that, over time, users may conceive of new ways to attempt to fraudulently claim ownership of a physical media carrier in order to obtain the corresponding electronic resource by way of the present technology. This may be enabled by new technologies for example. The system may therefore be configured to perform automated monitoring, statistical analysis, and/or human auditing in order to detect such illicit user activities. Countermeasures may then be developed and incorporated into the system to detect such activities and deny access to the electronic resource upon detection.

System Flow

Figure 8:
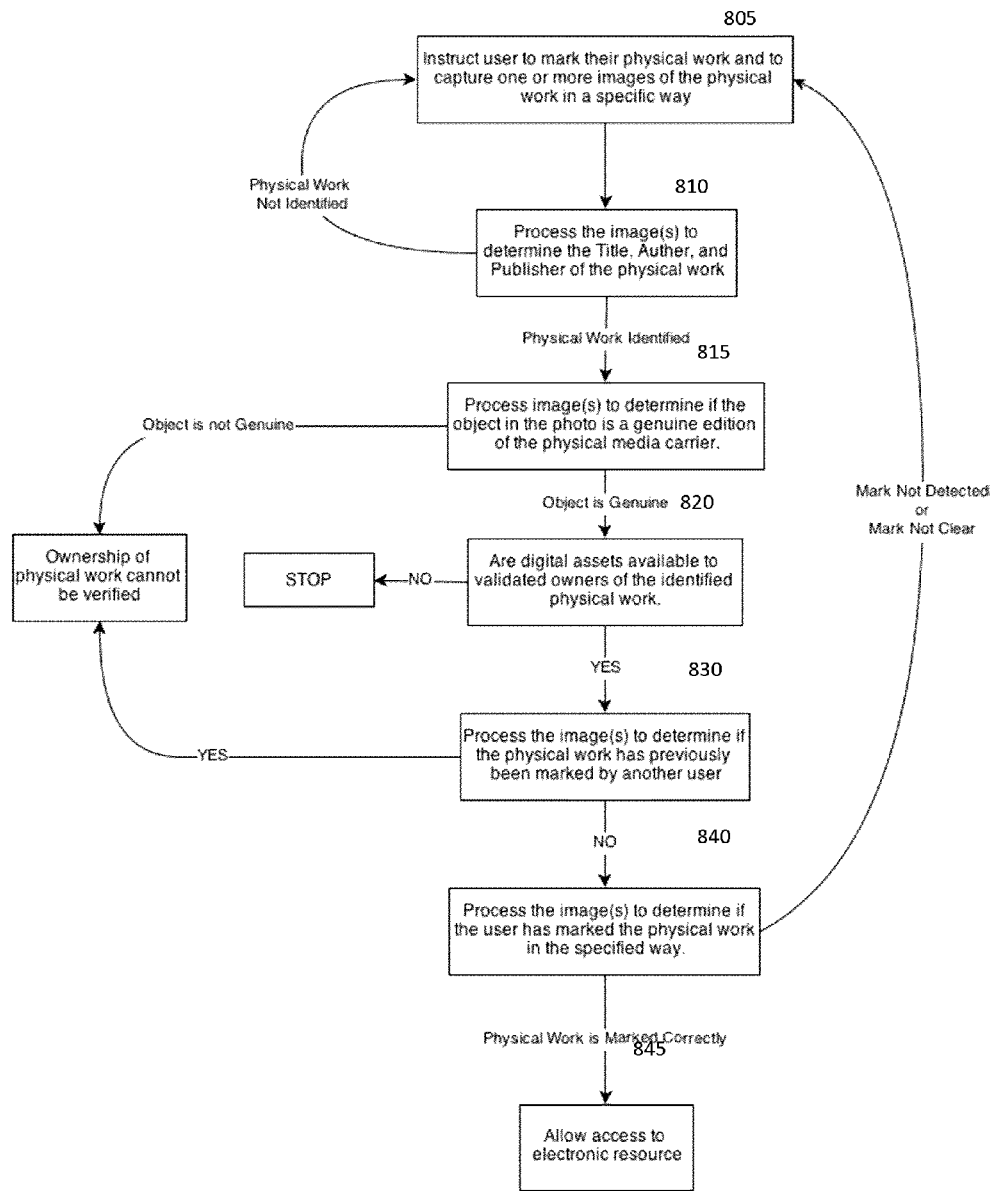
FIG. 8 illustrates a system operation flow diagram corresponding to embodiments of the present invention.

A high level system and method logic flow is provided in FIG. 8. As illustrated, the flow comprises instructing (805) the user to mark a physical work and to capture an image or multiple images of a physical work in a specific way. The instructions may be via text or prerecorded voice prompt, for example, augmented with graphical features such as guidelines overlaid onto the camera image. Further, the captured image is processed (810) to determine or verify information such as the title, author and/or publisher of the physical work, for example by performing optical character recognition. Next, the captured image is processed (815) to determine whether it is a genuine copy or edition of the physical work, rather than, for example, a printout, representation on a video screen, or other type of imitation readily identifiable by the system. Processing of the captured image may also be performed to determine (830) whether or not the physical work has been previously marked by a user in accordance with a prior iteration of the illustrated logic flow, or a similar process. If the physical work has been previously marked, the logic flow may terminate. Processing may be performed locally by the personal electronic device, remotely by a server after transmission of the image from the personal electronic device to the server, or a combination thereof. If identification and verification is successful, a query, for example of a database, is performed to determine (820) whether digital assets are available to validated owners of the identified physical work. The captured image(s) may be further processed (840 to determine if the user has marked the physical work in the specified way. If so, access is allowed (845 to the electronic resource, or more generally ownership of the physical work is verified. Access may be allowed for example by providing, from the server, a link to the electronic resource, or an electronic one-time voucher, initiation of an automatic download, or the like. In some embodiments, access is allowed without further payment. In other embodiments, access is allowed upon providing of a further payment, or along with automatic charging of a further payment to a user, credit card, or the like. The further payment is generally less than the current full price of the electronic resource.

It is noted that the above process may be varied in several ways, for example by adjusting the ordering of process steps. In some embodiments, one image or set of images of the physical work may be captured and processed. For example the images may be taken of the physical work following marking and be processed both to determine whether the work has been marked by the current user and to also determine whether the work had been previously marked, for example by another user. In other embodiments, images may be taken before and after marking by the user, and the two sets of images used cooperatively to determine such factors.

It will be appreciated that, although specific embodiments have been described herein for purposes of illustration, various modifications may be made without departing from the spirit and scope of the technology. In particular, it is within the scope of the technology to provide a computer program product or program element, or a program storage or memory device such as a transmission medium, magnetic or optical wire, tape or disc, or the like, for storing signals readable by a machine, for controlling the operation of a computer according to the method of the technology and/or to structure its components in accordance with the system of the technology. It is within the scope of the technology to provide plural computer program products or program elements, for example one for operation on a server and one for operation on a personal electronic device.

Further, steps of the methods may be executed on an appropriate general computer, such as a personal computer, personal electronic device, smartphone, server or the like and pursuant to one or more, or a part of one or more, program elements, modules or objects generated from any programming language, such as C, C++, Java, Perl, PL/1, or the like. In addition, each step, or a file or object or the like implementing each said step, may be executed by special purpose hardware or a circuit module designed for that purpose.

It is obvious that the foregoing embodiments of the technology are examples and can be varied in many ways. Such present or future variations are not to be regarded as a departure from the spirit and scope of the technology, and all such modifications as would be obvious to one skilled in the art are intended to be included within the scope of the following claims. Further, the scope of the claims should not be limited by the embodiments set forth as examples herein, but should be given the broadest interpretation consistent with the description as a whole.

The invention claimed is:

1. A computer implemented method for verifying ownership of a physical work, the method comprising:
    a) instructing a user to uniquely mark a first specified unmarked portion of the physical work in a specified way;
    b) instructing the user to capture one or more camera images of one or more specified portions of the physical work, including the first specified portion subsequent to unique marking thereof;
    c) providing data to a computer, said data including said one or more camera images in digital format;
    d) analyzing the one or more camera images by the computer to determine whether one or more predetermined conditions have been fulfilled, wherein said one or more predetermined conditions include verification that the user has marked the first specified portion of the physical work in the specified way; and
    e) upon determining that said one or more predetermined conditions have been fulfilled, verifying, by the computer, ownership of the physical work;
    wherein said instructing the user to mark the first specified portion of the physical work and said instructing the user to capture one or more camera images is performed by a personal electronic device.

2. The method according to claim 1, wherein another one of said camera images captures the first specified portion prior to marking thereof, and wherein said one or more predetermined conditions include verification that the first specified portion of the physical work was unmarked prior to the user having marked the first specified portion of the physical work in the specified way.

3. The method according to claim 2, wherein instructing the user to capture said one of said camera images comprises displaying, on a video screen, a live preview image of content presented to the camera overlaid with said other one of said camera images, and instructing the user to match the live preview image with said overlaid other one of said camera images prior to capturing said one of said camera images, thereby matching perspective of said one of said camera images with perspective of said other one of said camera images.

4. The method according to claim 1, wherein said one or more predetermined conditions include verifications of identity of the physical work, authenticity of the physical work, or both.

5. The method according to claim 4, further comprising instructing the user to capture at least one of the one or more camera images from a predetermined angle, and wherein verifying authenticity of the physical work comprises verifying that the user is capable of capturing at least one of the one or more camera images from said predetermined angle.

6. The method according to claim 4, wherein verifying authenticity of the physical work comprises determining sizes of the physical work in one or more dimensions and determining whether said determined sizes correspond to known characteristics of the physical work.

7. The method according to claim 4, wherein verifying authenticity of the physical work comprises analyzing said one or more camera images to determine whether the camera images are of a representation of the physical work displayed on a video screen.

8. The method according to claim 7, wherein determining whether the camera images are of the representation of the physical work displayed on a video screen comprises causing operation of a camera flash when capturing at least one of said camera images and analyzing said at least one camera image for reflective artifacts due to the flash, said reflective artifacts indicative that the at least one camera image is of the representation of the physical work displayed on a video screen.

9. The method according to claim 4, wherein the physical work is a book, wherein at least one of said camera images captures one or more pages of the book when opened, the method further comprising processing at least one of said camera images to detect a curvature of the one or more pages, and wherein verifying authenticity of the physical work comprises determining whether said curvature is within a predetermined range of expected curvatures.

10. The method according to claim 9, wherein said at least one of said camera images captures a first page and a second, facing page of the book when opened, and wherein verifying authenticity of the physical work comprises determining whether the curvature of the first page falls within a first predetermined range of expected curvatures and the curvature of the second page falls within a second predetermined range of expected curvatures, said first and second predetermined ranges depending on a location of said first and second pages relative to a beginning and an end of the book.

11. The method according to claim 1, wherein said data further includes a geographic location of a device used to capture the one or more camera images during said capturing of the one or more camera images, and wherein said one or more predetermined conditions include verification that said geographic location is within a predetermined acceptable region, outside of a predetermined unacceptable region, or both.

12. The method according to claim 1, further comprising obtaining a geographic location of a device used to capture the one or more camera images during said capturing of the one or more camera images, wherein operations for verifying ownership of the physical work are inhibited when said geographic location is outside a predetermined acceptable region.

13. The method according to claim 1, wherein at least one of said one or more camera images is a still camera image.

14. The method according to claim 1, wherein at least one of said one or more camera images is a video image comprising a series of further still camera images or video frames captured over time.

15. The method according to claim 14, wherein said video image is processed to infer a three-dimensional size, three-dimensional shape, or both three-dimensional size and three-dimensional shape, of the physical work, and wherein said one or more predetermined conditions include verification of authenticity of the physical work based on said three-dimensional size, three-dimensional shape, or both three-dimensional size and three-dimensional shape.

16. The method according to claim 1, wherein a first one of said one or more camera images is a still camera image, and wherein another of said one or more camera images is a video image comprising a series of further still camera images or video frames captured over time, said video image captured concurrently with said still camera image.

17. The method according to claim 1, wherein said one or more predetermined conditions include conditions of access to an electronic resource associated with the physical work, the method further comprising facilitating access by the user to the electronic resource upon verifying ownership of the physical work.

18. The method according to claim 1, wherein the user is assigned a trustworthiness level based on a history of activity associated with the user, and wherein an extent to which ownership of the physical work is verified is adjusted based on said trustworthiness level.

19. The method according to claim 1, wherein instructing the user to capture one or more camera images is repeated until said determination of whether said one or more predetermined conditions have been fulfilled is made with a predetermined level of confidence.

20. The method according to claim 1, wherein said analyzing the one or more camera images is performed at least in part by a human operator.

21. A computer program product comprising a non-transitory computer readable medium storing computer executable instructions thereon that when executed by a computer perform the method steps of claim 1.

22. A computer implemented method for verifying ownership of a physical work, the method comprising:
  a) instructing a user to capture one or more camera images of one or more specified portions of the physical work, said one or more specified portions including a first specified portion, said first specified portion expected to have been previously uniquely marked in a specified way if the physical work had previously been used in a prior attempt to claim ownership of the physical work, said prior attempt having required unique marking of the first specified unmarked portion in the specified way;
  b) providing data to a computer, said data including the one or more camera images in digital format;
  c) analyzing the one or more camera images by the computer to determine whether one or more predetermined conditions have been fulfilled, wherein said one or more predetermined conditions include verification that the first specified portion of the physical work had not been previously marked in association with said prior attempt to claim ownership of the physical work; and
  d) upon determining that said one or more predetermined conditions have been fulfilled, verifying ownership by the user of the physical work by the computer;
  wherein said instructing the user to capture one or more camera images is performed by a personal electronic device.

23. A system for verifying ownership of a physical work, the system comprising:
  a) a personal electronic device comprising a user interface module configured to: instruct a user to uniquely mark a first specified unmarked portion of the physical work in a specified way; and
  instruct the user to capture, using the personal electronic device, one or more camera images of one or more specified portions of the physical work, wherein one of said camera images captures the first specified portion subsequent to unique marking thereof;

b) a server communicatively coupled to personal electronic device, the personal electronic device and the server collectively comprising one or more processing modules configured to:

obtain data including the one or more camera images from the personal electronic device in digital format for analysis;

analyze the one or more camera images to determine whether one or more predetermined conditions have been fulfilled, wherein said one or more predetermined conditions include verification that the user has uniquely marked the first specified unmarked portion of the physical work in the specified way; and verify the user's ownership of the physical work upon determining that said one or more predetermined conditions have been fulfilled.

24. The system according to claim 23, wherein the one or more processing modules are further configured to direct operation of the user interface.

25. The system according to claim 23, wherein another one of said camera images captures the first specified portion prior to marking thereof, and wherein said one or more predetermined conditions include verification that the first specified portion of the physical work was unmarked prior to the user having marked the first specified portion of the physical work in the specified way.

26. The system according to claim 25, wherein instructing the user to capture said one of said camera images comprises displaying, on a video screen of the personal electronic device, a live preview image of content presented to the camera overlaid with said other one of said camera images, and instructing the user to match the live preview image with said overlaid other one of said camera images prior to capturing said one of said camera images, thereby matching perspective of said one of said camera images with perspective of said other one of said camera images.

27. The system according to claim 23, wherein said one or more predetermined conditions include verifications of identity of the physical work, authenticity of the physical work, or both.

28. The system according to claim 27, the user interface further configured to instruct the user to capture at least one of the camera images from a predetermined angle, and wherein verifying authenticity of the physical work comprises verifying that the user is capable of capturing said at least one of the camera images from said predetermined angle.

29. The system according to claim 27, wherein verifying authenticity of the physical work comprises determining sizes of the physical work in one or more dimensions and determining whether said determined sizes correspond to known characteristics of the physical work.

30. The system according to claim 27, wherein verifying authenticity of the physical work comprises analyzing said one or more camera images to determine whether the camera images are of a representation of the physical work displayed on a video screen.

31. The system according to claim 30, wherein determining whether the camera images are of the representation of the physical work displayed on a video screen comprises causing operation of a camera flash when capturing at least one of said camera images and analyzing said at least one camera image for reflective artifacts due to the flash, said reflective artifacts indicative that the at least one camera image is of the representation of the physical work displayed on a video screen.

32. The system according to claim 27, wherein the physical work is a book, wherein at least one of said camera images captures one or more pages of the book when opened, the one or more processing modules further configured to process at least one of said camera images to detect a curvature of the one or more pages, and wherein verifying authenticity of the physical work comprises determining whether said curvature is within a predetermined range of expected curvatures.

33. The system according to claim 32, wherein said at least one of said camera images captures a first page and a second, facing page of the book when opened, and wherein verifying authenticity of the physical work comprises determining whether the curvature of the first page falls within a first predetermined range of expected curvatures and the curvature of the second page falls within a second predetermined range of expected curvatures, said first and second predetermined ranges depending on location of said first and second pages within the book.

34. The system according to claim 23, wherein said data further includes a geographic location of a device used to capture the one or more camera images during said capturing of the one or more camera images, and wherein said one or more predetermined conditions include verification that said geographic location is within a predetermined acceptable region.

35. The system according to claim 23, further comprising obtaining a geographic location of a device used to capture the one or more camera images during said capturing of the one or more camera images, wherein operations for verifying ownership of the physical work are inhibited when said geographic location is outside a predetermined acceptable region.

36. The system according to claim 23, wherein at least one of said one or more camera images is a still camera image.

37. The system according to claim 23, wherein at least one of said one or more camera images is a video image comprising a series of further still camera images or video frames captured over time.

38. The system according to claim 37, wherein said video image is processed to infer a three-dimensional size, three-dimensional shape, or both three-dimensional size and three-dimensional shape, of the physical work, and wherein said one or more predetermined conditions include verification of authenticity of the physical work based on said three-dimensional size, three-dimensional shape, or both three-dimensional size and three-dimensional shape.

39. The system according to claim 23, wherein a first one of said one or more camera images is a still camera image, and wherein another of said one or more camera images is a video image comprising a series of further still camera images or video frames captured over time, said video image captured concurrently with said still camera image.

40. The system according to claim 23, further comprising facilitating access by the user to an electronic resource associated with the physical work upon verifying ownership of the physical work.

41. The system according to claim 23, wherein the user is assigned a trustworthiness level based on a history of activity associated with the user, and wherein an extent to which ownership of the physical work is verified is adjusted based on said trustworthiness level.

42. The system according to claim 23, wherein instructing the user to capture one or more camera images is repeated until said determination of whether said one or more predetermined conditions have been fulfilled is made with a predetermined level of confidence.

43. The system according to claim 23, wherein said analyzing the one or more camera images is performed at least in part by a human operator.

44. A system for verifying ownership of a physical work, the system comprising:
 a) a personal electronic device comprising a user interface module configured to: instruct a user to capture, using the personal electronic device, one or more camera images of one or more specified portions of the physical work, said one or more specified portions including a first specified portion, said first specified portion having been previously uniquely marked in a specified way if the physical work had previously been used in a prior attempt to claim ownership of the physical work, said prior attempt having required unique marking of the first specified unmarked portion in the specified way;
 b) a server communicatively coupled to the personal electronic device, the personal electronic device and the server collectively comprising one or more processing modules configured to:
 obtain data including the one or more camera images from the personal electronic device in digital format for analysis;
 analyze the one or more camera images to determine whether one or more predetermined conditions of have been fulfilled, wherein said one or more predetermined conditions include verification that the first specified unmarked portion of the physical work had not been previously uniquely marked in association with said prior attempt to claim ownership of the physical work; and
 verify the user's ownership of the physical work upon determining that said one or more predetermined conditions have been fulfilled.

45. A computer implemented method for facilitating access by a user to an electronic resource associated with a physical work, the method comprising:
 a) instructing a user to uniquely mark a specified unmarked portion of the physical work in a specified way;
 b) instructing the user to capture a camera image of the specified portion of the physical work;
 c) providing the camera image in digital format to a computer;
 d) analyzing the camera image by the computer to determine whether the specified unmarked portion of the physical work has been previously uniquely marked by another user;
 e) upon determining that the specified portion has been previously uniquely marked by another user, denying, by the computer, the first user access to the electronic resource;
 f) upon determining that the specified unmarked portion has not been previously marked by another user, determining, by the computer, whether or not the specified portion was correctly marked by the user;
 g) upon determining that the specified portion has been marked by the user in the specified manner, granting, by the computer, the user access to an electronic resource via the computer or another computer;
 wherein said instructing the user to uniquely mark the specified unmarked portion of the physical work and said instructing the user to capture the camera image is performed by a personal electronic device.

46. A system for facilitating access to an electronic resource associated with a physical work, the system comprising:
 a) a user interface module configured to instruct a user to uniquely mark a specified unmarked portion of a physical work in a specific manner, and to capture camera images of the specified portion of the physical work;
 b) an image capture module configured to obtain the camera images;
 c) a processing module configured to receive the camera images from the image capture module and analyze the camera images to determine whether the specified portion has been previously uniquely marked by another user;
 d) an access control module configured, upon determining that the specified portion has been previously marked by another user, to deny the user access to the electronic resource;
 e) a processing module that, upon determining that the specified portion has not been previously uniquely marked by another user, determines whether the specified portion has been marked in the specified manner; and
 f) an access control module that, upon determining that the specified portion has been uniquely marked in the specified manner, provides the user access to an electronic resource via a computer.

* * * * *